United States Patent [19]

Maiefski et al.

[11] 4,433,795
[45] Feb. 28, 1984

[54] LIQUID METERING AND DISPENSING SYSTEM

[75] Inventors: Romaine R. Maiefski, 1035 Golden Rd., Encinitas, Calif. 92024; Albert J. Puglisi, Escondido, Calif.

[73] Assignee: Romaine R. Maiefski, Encinitas, Calif.

[21] Appl. No.: 289,112

[22] Filed: Jul. 31, 1981

[51] Int. Cl.³ .............................................. B67D 5/30
[52] U.S. Cl. .................................... 222/14; 222/144.5
[58] Field of Search ................. 222/71, 17, 20, 21, 222/144.5, 14, 15, 16, 26, 28, 36, 67, 23; 417/1, 12

[56] References Cited

U.S. PATENT DOCUMENTS

| | | | |
|---|---|---|---|
| 3,638,832 | 2/1972 | Sauber et al. | 222/17 X |
| 3,991,911 | 11/1976 | Shannon et al. | 222/144.5 |
| 4,006,840 | 2/1977 | Shannon | 222/23 |
| 4,276,999 | 7/1981 | Reichenberger | 222/17 X |
| 4,331,262 | 5/1982 | Snyder et al. | 222/14 X |

Primary Examiner—Stanley H. Tollberg
Attorney, Agent, or Firm—Brown & Martin

[57] ABSTRACT

Positive displacement pumps, each having multiple pistons reciprocated by a swash plate, are connected to corresponding liquid reservoirs and are individually actuated to dispense a selected liquid type and pour size volume through a hand held gun. A digital control circuit receives feedback from an emitter, detector, chopper wheel combination associated with each pump to monitor the amount of liquid dispensed. The control circuit also monitors the actuation of switches on each dispensing gun and causes the desired pour size volume of the selected liquid to be dispensed. Pour size volume and pricing information may be programmed through a keyboard coupled to the control circuit and accounting information may be displayed or printed on command.

18 Claims, 15 Drawing Figures

LIQUID METERING AND DISPENSING SYSTEM

BACKGROUND OF THE INVENTION

The present invention relates to digitally controlled systems for selectively metering and dispensing small measured volumes of different types of liquids from storage reservoirs, and in particular, to a multi-station programmable, digitally controlled liquor metering and dispensing system for use in restaurants and bars.

In establishments which serve alcoholic beverages, accuracy of pour size volume, inventory control and accounting, and rapid service are key factors in maintaining a profitable operation. The procedures and equipment utilized by bar operators in an effort to maintain and improve profitability must comply with various state and federal laws governing the serving of alcoholic beverages.

When drinks are served directly from bottles, the authorized pour size volume is not repeatedly achieved with accuracy even though a shot glass is often used. Sometimes less than a full measure of liquor is served either by accident or intentionally. In other cases, more than a full measure of liquor is served, also by accident or intentionally.

Restaurants and bars can also have serious problems in regard to inventory control and accounting. Full or semifull bottles of liquor may be pilfered by employees. Bartenders serve unauthorized free drinks to friends and acquaintances. While the bartender may think that the liquor served at no charge only results in a wholesale loss to the proprietor of, for example, twenty-five cents, in actuality the proprietor has lost the profit in a normal sale, which may be one dollar for example. From time to time, bartenders may ring up on the cash register less than the establishment rate for drinks. For example, bartenders may sell drinks at Happy Hour rates during times when normal rates apply.

Problems of pour size volume inaccuracy and inadequate accounting and inventory control can lead to tens of thousands of dollars of lost profit over a year's time for a typical establishment serving alcoholic beverages.

Serving mixed drinks by manually retrieving and replacing individual bottles from a shelf is inherently inefficient. In addition, it frequently leads to losses due to spillage. The pouring of common mixed cocktails in this manner requires a small shelf or well adjacent to the pouring station where space is at a premium.

In the past, numerous devices and systems have been developed in an effort to improve the efficiency and profitability of bars which serve liquor. Some of these have included pumps in which a piston is reciprocated through one cycle in order to dispense one pour size volume of liquor. In order to vary the pour size volume, the stroke of the piston must be altered through manually adjustable mechanisms. The possible range of pour size volumes attainable with this type of pump is limited.

Another type of liquor dispensing device which has been developed has utilized a pump with a pneumatically driven piston. The level of air pressure and the timing of valves is adjusted in this type of device in order to control the pour size volume. In still another prior art liquor dispensing system, the liquor is gravity fed through a system of conduits. The opening and closing of valves is timed to deliver the desired pour size volume. In recent years alcoholic beverage dispensing systems have been developed which have utilized sophisticated electronic controls.

To date, prior art liquor metering and dispensing systems and devices have not provided an overall solution to the problems of inaccuracy of pour size volume, inadequate accounting and inventory control, dispensing speed and reliability to the degree necessary to insure an efficient and profitable bar operation. Specifically, prior systems and devices have generally had a limited range of pour size volume, for example one-half ounce to one and one-half ounces. In addition, prior art systems and devices have not lended themselves to quick changes in the pour size volume. For example, heretofore it has not been easy to readjust in order to serve single ounces of liquor during regular bar hours and double shots during Happy Hour.

The pour size volume accuracy of prior liquor metering and dispensing systems and devices has not been high. This has been attributable to a number of causes depending upon the particular system or device. For example, in prior liquor dispensing systems in which a single pour size volume has been dispensed through a single reciprocation of a piston, slight inaccuracies in the piston stroke adjustment mechanism may result in slightly more or less than the desired pour size volume being dispensed. In other prior systems, the misadjustment of metering screws in valves can cause inaccuracies in the pour size volume. Finally, in those prior art systems and devices which have utilized air pressure to deliver the liquid, fluctuations in the pressure and in the opening and closing times of valves can lead to pour size volume inaccuracies.

It can be readily understood that if a bartender pours only a few drops over the measured ounce of liquor to which a patron is entitled each time the bartender makes a drink, this slight overpour multiplied by thousands of times over a year can lead to a significant loss of profit to a restaurant or bar. The pour size volume accuracy problem has sometimes been compounded in those prior systems and devices which have had the capabilitty for varying the pour size volumes from, for example from one ounce to two ounces. Back and forth adjustments between single and double shot size drinks can introduce pour size volume inaccuracies which were not in a system or device when originally calibrated by the manufacturer.

Prior liquor metering and dispensing systems and devices have not been totally satisfactory in terms of inventory control and accounting. It would be desirable to call up at anytime information regarding liquor dispensed at any one of a number of multiple pouring stations. To be most helpful, this information should include a breakdown as to the number of drinks poured, the pour size volume of each drink, and the type of liquor. This data could be periodically compared with the total number of empty liquor bottles to prevent pilferage and the serving of free drinks. In addition, it would be desirable to be able to call up dollar sales totals with regard to drinks dispensed during a given time interval. Furthermore, it would be desirable to interface the liquor dispensing system with a cash register so that the ringing up of individual drinks would be expedited.

Prior liquor metering and dispensing systems and devices have sometimes been too simple in construction to enable them to fully meet the requirements for pour size volume accuracy, inventory control and accounting, and flexibility. In other cases, the prior art systems have been so complex as to be subject to repeated failures. It would therefore be desirable to provide a liquor dispensing system which would greatly enhance the profitability of a bar while being highly reliable and easily serviced.

SUMMARY OF THE INVENTION

Accordingly, it is the primary object of the present invention to provide an improved system for metering and dispensing selected pour size volumes of different types of liquids from reservoirs containing the same.

Another primary object of the present invention is to provide an improved liquor metering and dispensing system.

Another object of the present invention is to provide a liquor metering and dispensing system having substantially improved pour size volume accuracy.

Still another object of the present invention is to provide a liquor metering and dispensing system having a virtually unlimited pour size volume range.

Yet another object of the present invention is to provide a liquor metering and dispensing system in which the pour size volume can be rapidly changed without any sacrifice in pour size volume accuracy.

Still another object of the present invention is to provide a liquor metering and dispensing system having improved inventory and accounting control capabilities.

Another object of the present invention is to provide a liquor metering and dispensing system including one or more dispensing guns having a unique construction which is less subject to malfunctions.

Still another object of the present invention is to provide a liquor metering and dispensing system having improved reliability.

Another object of the present invention is to provide a liquor metering and dispensing system having a modularized construction which permits it to be readily expanded to dispense more brands of liquor and/or to dispense the liquor at more stations and which also permits it to be readily serviced by replacing defective modules.

Still another object of the present invention is to provide a liquor metering and dispensing system having a built-in diagnostic capability for facilitating trouble shooting.

Another object of the present invention is to provide a liquor metering and dispensing system which can be readily programmed with pricing and pour size information for normal bar hours and Happy Hour, and entertainment hours.

Finally, it is another object of the present invention to provide a liquor metering and dispensing system which has data storage capability, and an interface to bar cash registers for accounting functions, and an interface to onsight or remote computers for inventory and accounting control functions.

The present invention provides a multi-station, programmable, digitally controlled liquor metering and dispensing system which utilizes feedback control to achieve substantially improved pour size volume accuracy and virtually unlimited pour size volume range. A plurality of positive displacement pumps connected to corresponding liquid reservoirs are individually energized to dispense through a hand held gun a selected liquor type and pour size volume. A dispensing tower may be utilized in lieu of, or in addition to the dispensing gun. Each pump discharges a predetermined minute volume of liquid for each predetermined amount of rotation of its drive shaft by a motor. A chopper wheel on the pump drive shaft repeatedly intercepts a beam of radiation so that a detector emits a pulse signal for each predetermined amount of rotation of the drive shaft. A digital control circuit energizes a corresponding one of the pump motors in response to an operator actuating one of a plurality of selection switches on the gun to cause the selected type of liquor to be dispensed. The control circuit counts the pulse signals and de-energizes the motor when the count indicates that the previously selected pours size volume has been dispensed. Pour size volume and pricing information may be programmed through a keyboard coupled to the control circuit. Detailed accounting information is stored and outputted on a display or hard copy printer on command. The system has a modular construction which permits it to be readily expanded to dispense more brands of liquor and/or to dispense liquor at more stations. System faults are pinpointed utilizing a diagnostic program executed by the control circuit so that defective modules can be replaced.

DESCRIPTION OF THE PREFERRED EMBODIMENT

Figure 1:
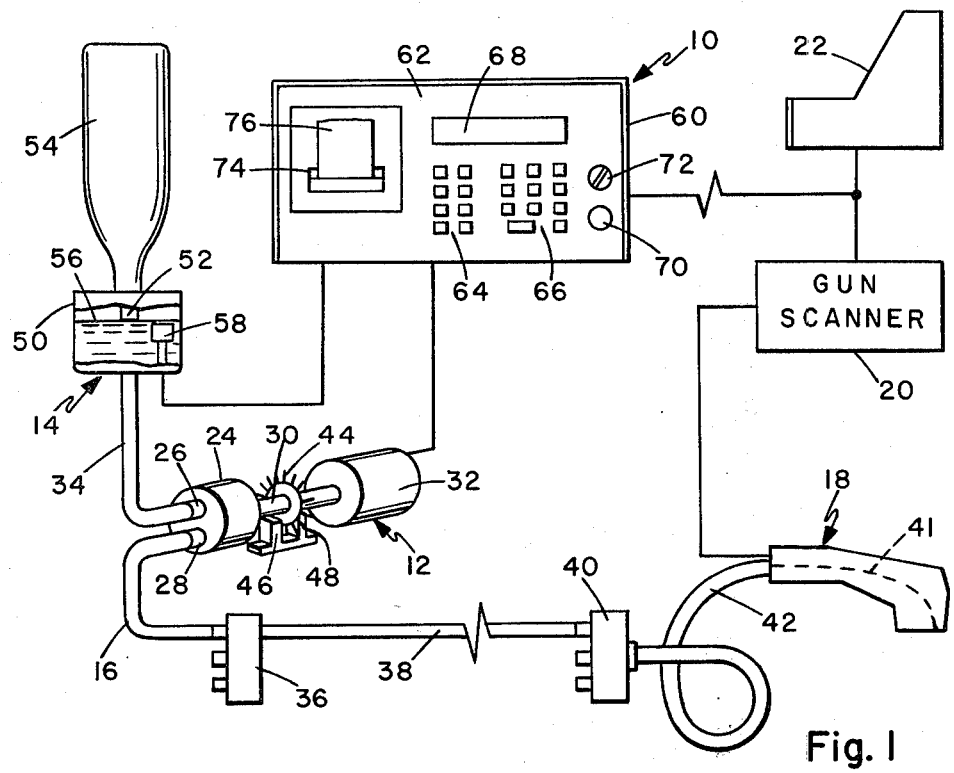
FIG. 1 is a pictorial diagram illustrating the operation of fundamental aspects of the system.

The overall operation of an illustrative embodiment of the liquor metering and dispensing system of the present invention will now be described by way of reference to the pictorial diagram of FIG. 1. For the sake of simplicity in that diagram, only basic components for a single station system have been illustrated in schematic form. A central control terminal 10 causes one of a plurality of pump modules such as 12 to deliver liquor from a reservoir 14 through a flow line 16 and out of a dispensing gun 18 in response to an operator manually depressing one of a plurality of switches on the gun. A gun scanner 20 sends coded signals to the central control terminal 10 representative of which of the switches on the gun have been manually actuated. The gun scanner 20 may be connected to an electronic cash register 22 which rings up a sale in response to the dispensing of a pour size volume of liquor.

Preferably, the system has multiple dispensing guns 18 (FIG. 1) for use by separate bartenders at different stations. The system may also utilize dispensing towers of the general type known in the industry. These towers may be utilized in lieu of, or in addition to, the dispensing guns. The system also has multiple reservoirs 14 for each storing a different brand of liquor. A separate pump module 12 connects each reservoir with a corresponding dispensing gun. By way of example, for a very small configuration of the system there may be two dispensing guns 18, twelve reservoirs 14, and a total of twenty-four pump modules 12. Twelve of the pump modules are connected between the twelve reservoirs 20 and one of the dispensing guns, one pump module corresponding to each of the reservoirs. The other twelve pump modules connect the twelve reservoirs 14 to the other one of the dispensing guns. Thus, each of the guns may separately dispense on demand a predetermined pour size volume of a selected one of the twelve brands of liquor.

Each of the pump modulees 12 (FIG. 1) includes a pump 24 having an inlet 26, an outlet 28, and a drive shaft 30. Preferably, the pump 24 is a positive displacement pump which has very good slip efficiency. In other words, the pump is constructed so that a minimum amount of liquid passes by the pumping elements without being forwardly conveyed thereby. One suitable positive displacement pump for the system of the present invention is an axial piston type pump which is described hereafter in greater detail. It includes a plurality of circumferentially spaced cylinders aligned with their axes generally parallel. A plurality of pistons are reciprocable in corresponding ones of the cylinders. A swash plate rotated by the pump drive shaft 30 engages and reciprocates the pistons.

It is desirable to utilize a positive displacement pump since it will deliver a precise amount of liquid for each predetermined amount of movement of a driven pump element, which in FIG. 1 comprises the pump drive shaft 30. A motor 32, which preferably comprises a DC electric motor, has its output shaft drivingly connected with the pump drive shaft 30. A flow line 34 connects the inlet 26 of the pump to the reservoir 14. For each predetermined amount of rotation of the pump drive shaft 30, a predetermined minute volume of the liquid contained within the reservoir 14 is pumped through the pump outlet 28 and through the flow line 16. As will become more apparent hereafter, the predetermined minute volume is less than or equal to the minimum pour size volume of liquor that will be expected to be dispensed under normal circumstances.

Each of the flow lines 16 (FIG. 1) from separate pump modules are connected to one side of a first manifold assembly 36. This assembly serves as a mounting platform for a plurality of first check valves (not visible in FIG. 1) which permit only one way flow of liquid toward the dispensing gun 18. A plurality of lengthy flow lines 38 have their one ends connected to the other side of the first manifold assembly 36 and their other ends connected to one side of a second manifold assembly 40. The flow lines 38 may extend a substantial distance, for example 50 to 200 feet. They connect the multiple dispensing guns 18 at bar stations remote from the central control terminal 10 to the pump modules 12 and reservoirs 14. The flow lines 38 may therefore preferably have a substantially larger inside diameter than the flow lines 16 and 34. A plurality of second check valves are mounted to the second manifold assembly 40 on the left side thereof in FIG. 1. They again permit only one way flow of liquid from the pump modules to the dispensing guns 18. The second manifold assembly 40 also has a plurality of passages for connecting the flow lines 38 to smaller flow lines 41. The flow lines 41 convey the liquor through a flexible metal hose 42 and through the dispensing gun 18.

The system of the present invention utilizes closed loop feedback in order to achieve high pour size volume accuracy. A desired pour size volume is preprogrammed into the central control terminal 10 by an operator. Thereafter, when a bartender actuates a liquid brand switch on one of the dispensing guns 18, the central control terminal energizes the motor 32 of the appropriate one of the pump modules 12. This causes the selected brand of liquor from the appropriate one of the reservoirs 14 to be delivered by the pump 24 through the gun 18 into the glass. During the energization period of the motor 32, the central control terminal counts the number of times that the pump drive shaft 30 moves the predetermined amount that corresponds to the delivery of a predetermined minute volume of liquor. The central control terminal thereafter de-energizes the motor when the count indicates that the pump has discharged the preprogrammed pour size volume of liquor.

In the embodiment described herein, a chopper wheel 44 (FIG. 1) is mounted on the pump drive shaft. The chopper wheel has a toothed peripheral edge for repeatedly intercepting a beam of radiation during powered rotation of the pump shaft by the motor 32. A device 46 is mounted adjacent the pump shaft for emitting a beam of radiation in a generally axially direction with respect to the pump shaft. A detector 48 receives the beam of radiation and generates an output signal in response thereto. Thus, as the pump shaft 30 rotates, the detector 48 generates pulse signals, each pulse signal representing a predetermined amount of angular rotation of the pump drive shaft. Each predetermined amount of angular rotation of the pump drive shaft in turn represents a predetermined identical minute volume of liquor being dispensed by the pump into the flow line 16.

It will be understood that because of the length of the various flow lines, the liquor actually moved by the pump when a typical pour size volume is requested is not the same liquor which is discharged out of the gun 18. However, the displacement of an exact amount of liquor by the pump into the flow line 16 moves a corresponding volume of liquor through the flow lines forward thereof and out of the gun. The flow lines are always full of liquor. Back movement of liquor is prevented by the check valves mounted in the manifold assemblies 36 and 40.

Liquid within the flow lines 41 (FIG. 1) does not flow out of the gun unless the appropriate one of the pumps is energized. Air cannot enter the second manifold assembly 40. Therefore the liquid in the flow lines ahead of this assembly cannot flow out unless liquid is pumped into the same from the flow lines 38. The liquor stays in the flow lines which run through the handle 18 for the same reason that liquid stays in a straw when the upward end is covered by the index finger.

In a commercial embodiment of the present invention, the chopper wheel 44 has a sufficient number of gaps between its teeth to cause the detector 48 to generate 30 pulse signals for each 360 degrees of revolution of the pump shaft 30. The pump 24 is sized so that approximately 881 pulse signals are generated in order to dispense approximately one ounce of liquor. The central control terminal 10 is capable of starting and stopping the motor 32 to provide an accuracy of approximately plus or minus one-thirty second of an ounce of liquor dispensed through the gun 18. Thus, the liquor dispensing system of the present invention has a pour size volume accuracy capability which is greatly improved over that of the prior art systems. The pour size volume accuracy of our system does not depend upon the precise adjustment of the stroke of a piston, the amount of pump motor current, the adjustment of metering screws and valves, upon specified air pressure or upon the opening and closing times of valves. Instead, the liquor metering and dispensing system of the present invention utilizes a closed loop feedback to precisely monitor the amount of liquid actually being dispensed. Since a positive displacement pump is utilized, each predetermined amount of rotation of the pump drive shaft indicates that a predetermined minute volume of liquor has been dispensed. Accordingly, the precise pour size volume of liquor desired can be dispensed by knowing in advance the amount of rotation of the pump drive shaft that will exactly deliver this volume of liquor. In the preferred embodiment of our system, pulse signals indicative of a predetermined amount of rotation of the pump shaft are generated and counted by the central control terminal 10. The pump motor is de-energized when the count indicates that exactly the correct amount of liquor has been delivered.

Additionally, it will be understood that the liquor metering and dispensing system of the present invention has a virtually unlimited pour size volume range. A few drops can be dispensed by rotating the pump drive shaft through an angle of, for example, twenty-four degrees, indicated by a few pulse signals from the detector 48. On the otherhand, the pump 32 can be energized to cause several gallons or more to be dispensed merely by specifying that the motor be energized for the required number of pulses. As explained hereafter in greater detail, the central control terminal may be preprogrammed by the operator to specify the desired pour size volume. The pour size volume can be quickly varied without any sacrifice in pour size volume accuracy. This can be done by reprogramming the central control terminal or selecting one of several preprogrammed pour size volumes, for example, half-shots, full shots or double shots.

Each of the reservoirs 14 (FIG. 1) comprises a chamber 50 having an upright inlet 52 adapted to be inserted into the spout of an inverted liquor bottle 54. The liquor within the bottle 54 fills the chamber 52 to a level 56. A float switch 58 associated with the chamber provides a signal to the central control terminal when the bottle 54 and the chamber 50 are empty. The central control terminal 10 in turn provides a restock signal to the bartender in the form of a flashing light adjacent the switch associated with that brand of liquor. At the same time, the signal generated by the float switch 58 also causes the central control terminal to inhibit further energization of the pump motor 32 to thereby prevent undesirable pumping of air.

The central control terminal 10 (FIG. 1) includes the necessary control circuitry for executing the desired functions. Linear drive circuitry is provided for the motors of the pump modules and the digital control circuitry for performing the necessary logic functions required in executing the functions of the system. This circuitry is housed within a rectangular metal box 60 having a front panel 62. Mounted on the front panel are function and numerical keyboards 64 and 66, an alphanumeric display 68, and key operated on/off and mode selection switches 70 and 72, respectively. In addition, the output slot 74 of a printer is located on the face panel 62 of the central control unit. Accounting information can be generated in hard copy on a web 76 of paper on command which is fed through the shot. The display 68 may be any suitable display, such as an LED matrix display or an LCD display. It is utilized to display pour size volume and pricing information as well as function information entered by an authorized operator through the keyboards 64 and 66.

The key operated mode selection switch 72 (FIG. 1) allows the system to operate in one of several modes. In the OPERATE MODE, the system dispenses selected pour size volumes of liquor through various dispensing guns on command. The system also maintains in its internal memory information representative of the number of pour size volumes, the size of portions served, the prices, and the type of liquor dispensed at each dispensing station. When the system is in its PROGRAM MODE, various pour size volume and pricing information may be programmed into the system which will govern its operation in the OPERATE MODE. The system may also be operated in a DIAGNOSTIC MODE. In this mode the system provides the operator with various inquiry commands to test the system. The user can utilize these commands to isolate a problem or malfunction down to a given module or component within the system. Yet another mode of operation of the system is referred to herein as a SPECIAL MODE. It is similar to the OPERATE MODE in that all the dispensing functions are enabled. However, in the SPECIAL MODE, pour size volume and pricing are shifted automatically to new specifications. This mode is very useful for example, when the operator wishes to shift all of the pricing and pour size parameters to a Happy Hour or Entertainment Hour status, without going through a reprogramming procedure. During aforementioned hours, drinks may be served at a different price than during normal operations. Furthermore, the drinks may contain a different pour size volume of liquor than during normal operations, for example, a double shot of liquor.

Figure 2:
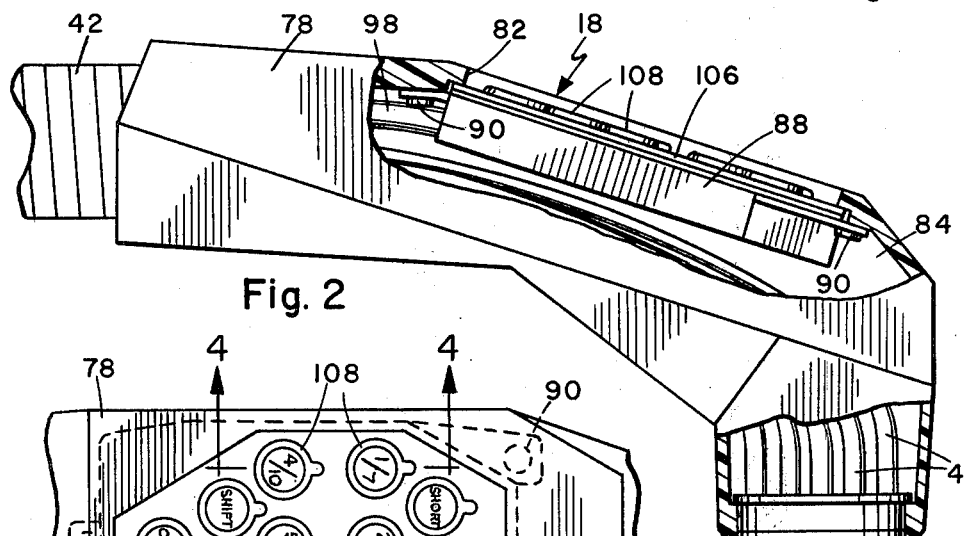
FIG. 2 is a side elevation view, partially cut away, of a preferred embodiment of the dispensing gun.

Details of the construction of the dispensing gun 18 may now be described in conjunction with FIGS. 2-4. The gun includes a case 78 which is adapted to be grasped between the fingers and thumb of a bartender's hand. The case is preferably made of durable plastic. The case is configured with biomechanical considerations taken into account so that the bartender can comfortably hold the gun and depress one of a plurality of switch actuating buttons 108. These buttons overlie a plurality of switches 80 (FIG. 4). The buttons 108 are accessible through a rectangular aperature 82 (FIG. 3) on the upper side of the case 78 intermediate its length. The case 78 of the gun defines an interior 84 which is sufficiently large to enclose the forward portions of the plurality of the flow lines 41.

There are twelve separate flow lines 41 which extend through each gun case 78. The forward ends of the flow lines are received in holes which extend through a disk-shaped delivery head 86 (FIG. 2) fit into the forward end of the case 78. A plurality of individual filter screens (not visible in FIGS. 2-4) are also fit within the holes in the delivery head 86 to prevent impurities carried in the flow lines 41 from being dispensed into a glass. The forward end of the flexible metal hose 42 (FIG. 2) is secured in a hole in the rearward end of the gun case 78. The flow lines 41 extend from the interior of the hose through the gun case to the delivery head 86.

It is preferred to have the flow lines 41 extend through the gun in straight line segments. Curved flow lines have a tendency to kink. Therefore, a right angle manifold (not shown) is preferably used in the forward end of the gun to connect short segments of the flow lines 41 extending upwardly from the delivery head 86 to longer segments of the flow lines 41 which extend horizontally through the gun case 78 and hose 42. A generally diamond shaped switch module 88 (FIGS. 2 and 3) is mounted in the upper portion of the gun case 78. The plurality of selection switches 80 are mounted in the switch module. The switch module 88 is detachably secured to the gun case 78 by screws 90 shown in phantom lines in FIG. 3. The switches 80 may be actuated by depressing the buttons 108 with a thumb or finger. Each of the buttons has indicia associated therewith indicating the functions that may be commanded by depressing the same.

Figure 3:
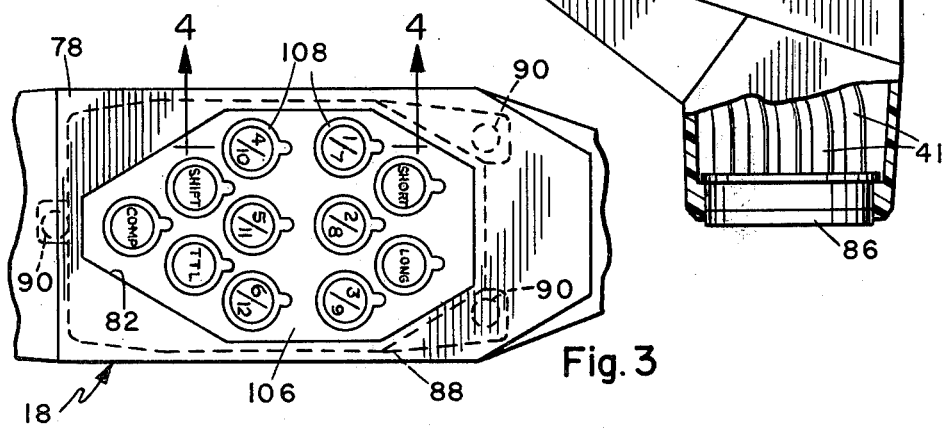
FIG. 3 is a top plan view of the portion of the dispensing gun illustrating the location of its manually actuable switches.
Figure 4:
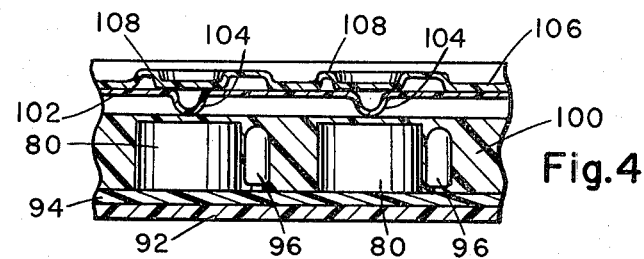
FIG. 4 is an enlarged, fragmentary sectional view of the dispensing gun taken along line 4—4 of FIG. 3.

FIG. 3 illustrates the indicia utilized on a commercial embodiment of the dispensing gun. The SHORT button may be depressed to dispense a short portion of liquor, while the LONG button may be depressed to dispense a long portion of liquor. The actual pour size volumes of the SHORT and LONG portions are preprogrammed into the cental control terminal 10. The buttons with the numbers on them are depressed to select a particular brand of liquor. Depressing of either the SHORT or LONG buttons prior to depressing one of the brand selection buttons will cause either a SHORT or LONG portion of the selected liquor brand to be dispensed. If neither one of the pour size buttons is depressed prior to depressing a brand switch, a regular portion size of the selected liquor brand will be dispensed. The regular portion size is usually a volume of liquor somewhere between a SHORT and LONG portion and is also preprogrammed into the central control terminal 10.

Each of the brand selection buttons 108 (FIG. 3) has two numbers thereon corresponding to two different brands of liquor. For example, the button having the indicia "5/11" is associated with liquor brands 5 and 11 which are known to the bartender. For example, brand number 5 may be CHEVES REGAL Scotch whiskey and brand number 11 may be JOHNNY WALKER RED LABEL Scotch whiskey. Normally when a particular one of the brand selection buttons is depressed, this will command the dispensing of the lower numbered brand associated with that button. By depressing the SHIFT button prior to depressing one of the brand selection buttons, the higher numbered brand will be dispensed.

The TTL button in FIG. 3 is used in conjunction with a direct cash register interface for totalizing cash register transactions. The COMP button is depressed initially if bartender wishes to pour a complementary drink. The central control terminal keeps track of the number of complementary drinks served in its internal memory. When reports are generated by the central control terminal, complementary drinks are counted insofar as usage reports but are not counted as part of the cash total.

The dispensing gun 18 is constructed to achieve high reliability during long periods of heavy use. Dispensing guns in prior art liquor dispensing systems have been subject to failures caused by corrosion of the switches and other electrical components. The dispensing gun 18 of the present invention incorporates a replaceable switch module 88 which is specially constructed to minimize failures due to corrosion and other problems. Referring to FIG. 4, the switch module includes a diamond-shaped housing 92 having a bottom wall and eight side walls. The switches 80 are preferably snap action type switches which are closed by depressing their central portions. Preferably, the switches are themselves individually sealed to prevent moisture from affecting their active contacts. One suitable switch is manufactured by Standard Grigsby of Chicago, Ill., type TL 360, part number 48496-PB. The leads of the switches 80 are soldered to the conductive pattern of a PC board 94. Adjacent each one of the switches 80 is a LED 96 whose leads are also soldered to the conductive pattern of the PC board 94. When the reservoirs 14 (FIG. 1) for each of the first six brands of liquor are non-empty, the corresponding LEDs adjacent the six brand selection buttons are illuminated by the central control terminal. When the bartender desires to ascertain the empty/full status of the remaining six brands of liquor, he or she depresses the SHIFT button (FIG. 3) and the central control terminal again illuminates all of the LEDs 96 if the corresponding reservoirs which contain these brands of liquor are non-empty. The central control terminal determines the empty/full status of the reservoirs 14 by monitoring the float switches 58 (FIG. 1). When a reservoir for a particular brand of liquor is empty, the central control terminal causes the LED adjacent the corresponding brand selection button to flash on and off, signaling the bartender that the corresponding bottle 54 must be replaced.

Electronic circuitry inside the gun scanner 20 (FIG. 1) which is hereafter described monitors the switches 80 on the dispensing gun and sends coded signals to the central control terminal representative of which of the switches has been depressed. This reduces the number of wires which must extend between each gun and the central control terminal. The wires which are connected to the switches 80 and the LEDs 96 are connected at their remote ends to the PC board 94 and extend in a cable bundle 98 (FIG. 2) through the flexible metal hose 42. The cable 98 is anchored to the housing 92 to remove the flexure stresses generated by movement of the dispensing gun away from the soldered connections. The wires in the other end of the cable 98 are soldered to an elongate PC card (not shown) configured to mate with a female edge card connector. This PC card enables the cable to be readily slid through the hose 42 and connected without requiring on site assembly, crimping, or soldering. These terminations are also sealed with an elastomeric material to prevent intrusions of moisture.

Referring again the FIG. 4, means are provided for encasing the entire PC board 94, switches 80 and LEDs 96 to prevent them from being exposed to corrosive agents such as water or alcohol. As illustrated in FIG. 4, the encasing means may take the form of a quantity 100 of pliant potting compound such as silicone rubber which completely surrounds the PC board, switches and LEDs. The quantity of potting compound 100 also defines a pliant layer which extends across the tops of each of the switches 80 and which is sufficiently pliant to enable each of the switches to be manually actuated.

An actuator template 102 (FIG. 4) overlies the upper layer of the pliant potting compound 100. The actuator template has a plurality of downwardly extending bumps 104 formed therein, each of which is in registration with one of the snap action switches 80 for closing that switch when depressed by a digit of the bartender's hand. Finally, a graphic template 106 overlies the actuator template 104 and has the plurality of annular buttons 108 formed therein which are in registration with corresponding ones of the switches 80. The buttons 108 permit the bartender to accurately locate his or her digit over one of the switches which he or she desires to actuate. Thereafter, by pressing down on a button, the forces are transferred to the underlying bump 104 of the actuator template which in turn operates the snap action switch 80 therebeneath. The brand numbers and functions indicia shown in FIG. 3 are written on the graphic template inside corresponding buttons 108. Preferably, the templates 102 and 106 are made of a plaint or flexible material such as plastic and are semi-transparent so that the light emitted by the LEDs 96 will be visible.

Figure 5:
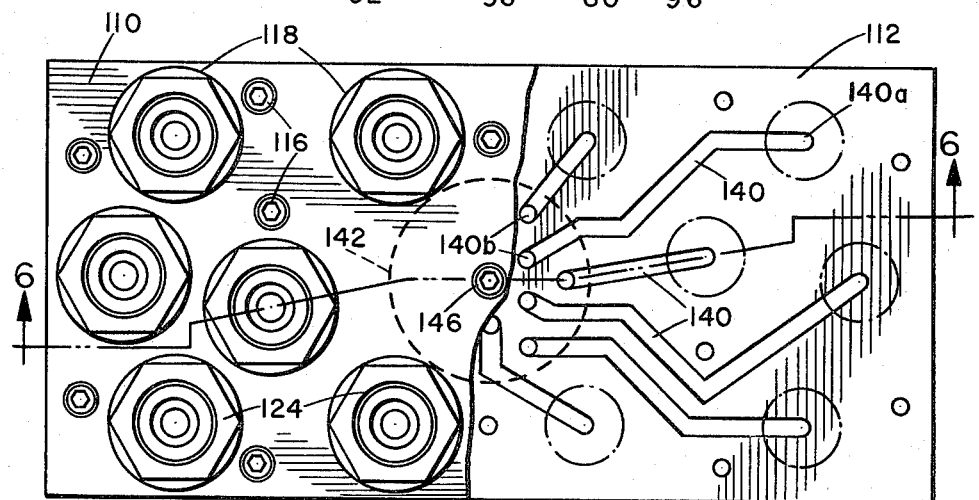
FIG. 5 is a side elevation view, partially cut away, of one of the manifold assemblies of the system.
Figure 6:
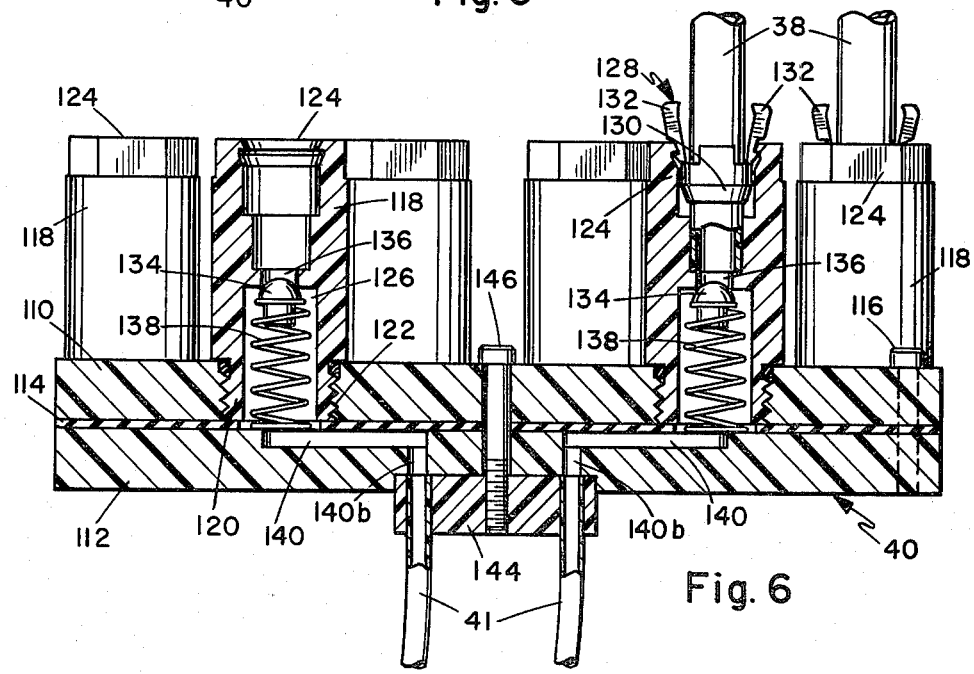
FIG. 6 is a sectional view of the manifold assembly of FIG. 5 taken along line 6—6 of FIG. 5.

FIGS. 5 and 6 illustrate construction details of a preferred embodiment of the second manifold assembly 40 (FIG. 1). This manifold assembly serves to connect the long flow lines 38 which extend to a particular bar station to the smaller flow lines 41 which are bundled together and extend within the flexible metal hose 42 and the gun 18. The second manifold assembly 40 includes a pair of stacked blocks 110 and 112 which are held together in sandwiched configuration about a flexible gasket 114. In the illustrated form of the second manifold assembly 40 which forms part of the commercial embodiment of the present invention, twelve separate flow lines 38 are coupled to the assembly on one side and twelve separate smaller flow lines 41 are coupled to the other side of the assembly. Liquid from each of the flow lines 38 is channeled separately through the blocks 110 and 112 to a separate corresponding one of the flow lines 41.

The blocks 110 and 112 are preferably made of a strong synthetic material such as that sold by Celenese Corporation under the trademark CELCON or that sold by Dupont Corporation under the trademark DELRIN. The blocks 110 and 112 are squeezed together about the gasket 114 by a plurality of bolts 116. Twelve separate cylindrical couplers 118 have their inner male threaded ends 120 screwed into corresponding female threaded holes 122 which extend through the block 110. The cylindrical couplers 118 are each formed with hex nut outer ends 124 which may be engaged by a wrench to tighten the couplers into the block 110.

Each of the couplers 118 (FIGS. 5 and 6) has a bore which extends therethrough, the bore being divided into an outer connector portion 124 and an inner valve portion 126. The connector portion 124 of each bore is conformably shaped for receiving a corresponding retainer clip 128. These retainer clips have an annular collar 130 which slips over the end of one of the flowlines 38 and a pair of ears 132 which may be squeezed together to insert the end of the flow line 38 and the retaining clip into the connector portion of the bore of one of the cylindrical couplers 118. When the ears 132 are thereafter released, they spread apart to retain the flow line and retaining clip in position while providing a liquid tight seal. Further details of the retainer clip are disclosed in U.S. Pat. No. 3,858,913 of Stephen F. Gallagher. By this arrangement, the flow lines 38 may be quickly connected and disconnected to the second manifold assembly.

Each of the couplers 118 of the second manifold assembly 40 (FIGS. 5 and 6) is further provided with a check valve to permit only one way flow of liquid toward the dispensing gun 18. Specifically, as shown in FIG. 6, a resilient valve element 134 seats in a small passage 136 connecting the bore portions 124 and 126. The end of the element 134 which seats against the passage 136 is rounded. The other end of the element has a cylindrical shape and is surrounded by one end of a spring 138 whose other end engages the other block 112 through a hole in the gasket 114. When the appropriate one of the pump motors is energized, liquid flowing through one of the flow lines toward the dispensing gun will unseat the valve element 134 and permit the liquid to flow through the second manifold assembly into the corresponding one of the flow lines 41. When the pump motor is thereafter de-energized, the valve element will be pushed by the spring back against the passage 136, sealing the same to prevent back flow of liquid.

Each of the female threaded holes 122 which extends through the block 110 is aligned with a corresponding hole in the gasket 114. The holes 122 are also aligned with the corresponding outer ends 140a of a plurality of passages 140 which extend laterally along the inner surface of the block 112. It will be noted that the cylindrical couplers 118 are spread over the block 110. The passage 140 extend from each of the holes 122 in the block in snake like fashion to locations within a central smaller ring 142 representative of the outer periphery of a disk shaped distribution head 144 (FIG. 6). The inner ends 140b of each of the passages 140 are each in registration with a corresponding hole through the distribution head 144. The ends of the flow lines 41 fit tightly within each of these holes through the distribution head. The various flow lines of the system may be made of durable plastic material such as that sold under the trademark NYLON. A bolt 146 extends through the blocks 110 and 112 and holds the distribution head 114 in place.

Figure 7:
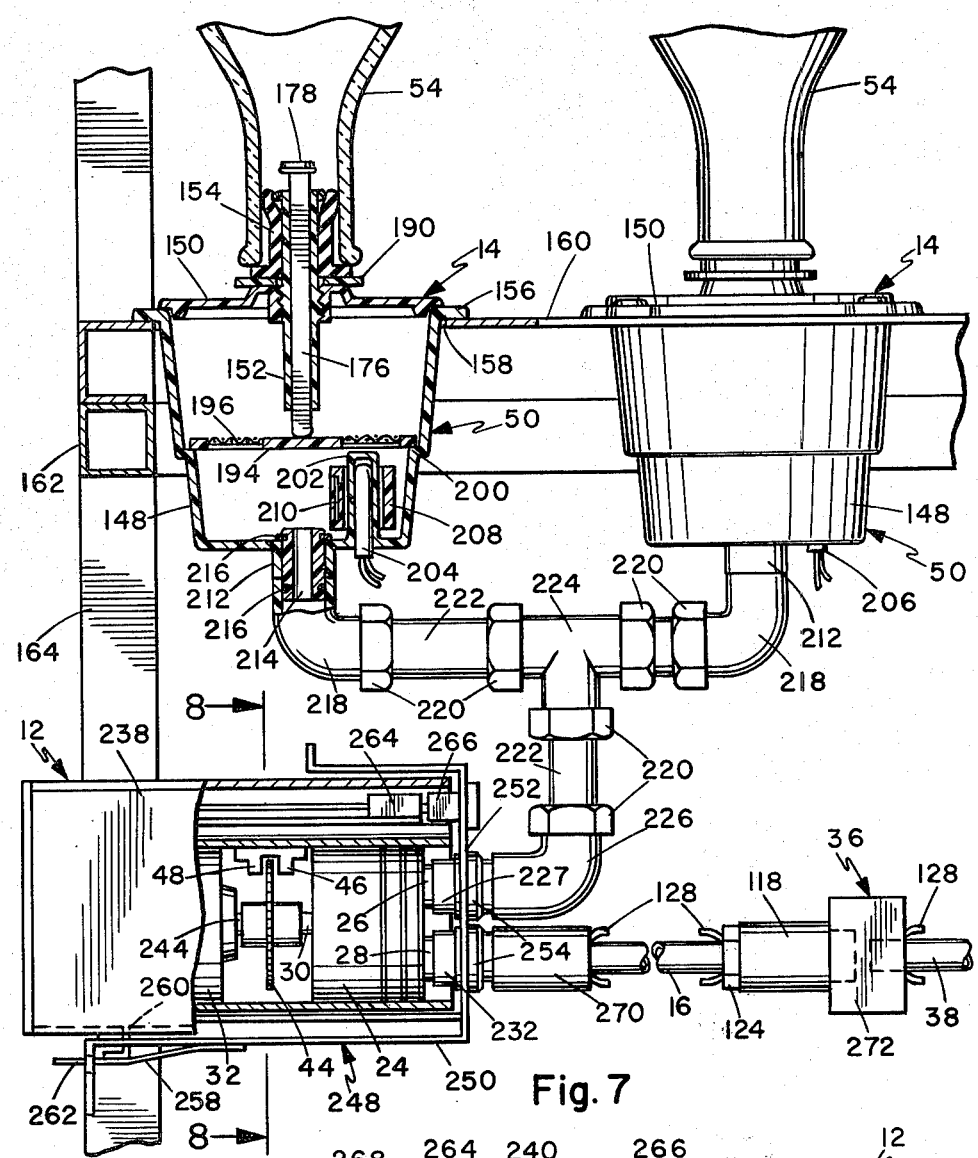
FIG. 7 is a side elevation view, with portions cut away, of dual reservoirs connected to a pump module, the reservoirs and pump module being supported on a liquor shelf and a pump shelf, respectively carried by an upright rack.

The manner in which the reservoirs 14 (FIG. 1) are connected to the pumps 24 is illustrated in FIG. 7. The chamber 50 of each of the reservoirs includes a lower cup-shaped body portion 148 and a removable lid portion 150. Again, the portions 148 and 150 may be made of suitable durable plastic materials such as those sold under the trademarks DELRIN and CELCON. The same is true of the various plumbing components described herein. The lid 150 of each reservoir includes an upwardly extending inlet 152 having surrounding cork means 154 which is manually expandable in the spout of one of the inverted liquor bottles 54 for providing a liquid tight seal. The body portion 148 of each reservoir has an annular upper lip 156. The body portion fits into a round hole 158 which is formed in the horizontal planar portion of a removable liquor shelf 160. The liquor shelf 160 is in turn supported at its opposite ends by cross members 162 of a vertically extending rack or frame 164. The lip 156 of the body portion 148 of each chamber serves to keep the body portion from falling through the shelf.

Figure 9:
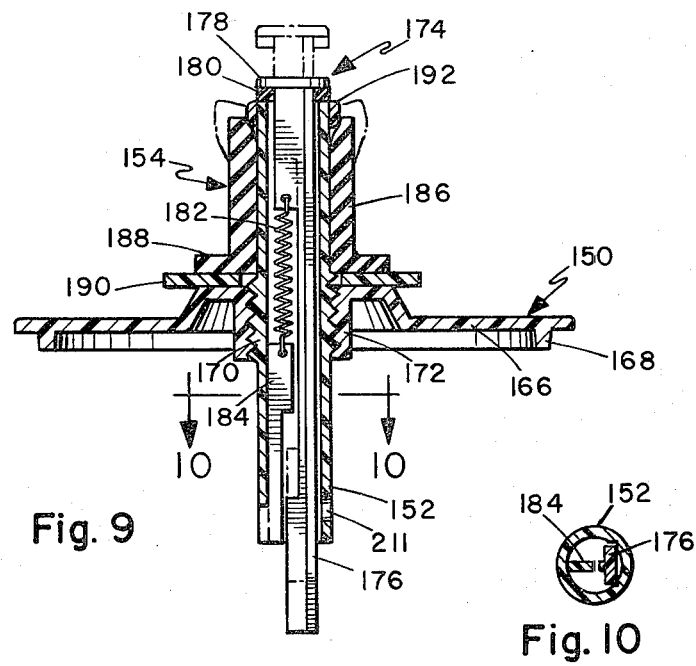
FIG. 9 is an enlarged vertical sectional view of a portion of one of the reservoirs of FIG. 7 illustrating details of its plunger valve and expandable cork.
Figure 10:
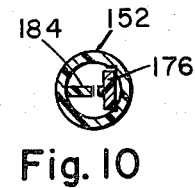
FIG. 10 is a sectional view taken along line 10—10 of FIG. 9.

Details of the inlet 152 and cork means 154 of each of the reservoirs 14 are illustrated in FIGS. 9 and 10. The lid 150 has a disk-shaped planar portion 166 and a downwardly extending annular flange 168 which centers the lid over the top of the body portion 148 of the chamber. The inlet 152 comprises an elongate tube having a male threaded central portion 170 which is screwed into a female threaded central cylindrical portion 172 of the lid 150. A plunger valve 174 has a stem 176 which extends vertically through the central bore of the inlet 152. The plunger valve 174 has a head 178 integrally formed to the upper end of the stem. A resilient annular gasket 180 surrounds the stem 176 directly beneath the head 178 of the plunger valve. The gasket is squeezed against the upper end of the inlet 152 to provide a liquid tight seal when the plunger valve is in its position shown in solid lines in FIG. 9. Thus, the plunger valve normally seals the inlet 152. A spring 182 has one end connected to the upper portion of the plunger valve stem 176 and has its other end connected to a L-shaped leg 184 extending centrally within the bore of the inlet 152 adjacent its lower end. The spring 182 urges the plunger valve downwardly so that it normally seals the inlet. The L-shaped leg 184 is thus fixed and the plunger valve stem 176 clears the same for vertical reciprocation within the inlet 152 as shown in FIG. 10.

The cork means 154 includes a cylindrical sleeve 186 made of resilient material which surrounds the upper end of the inlet 152. The sleeve 186 has an annular flange 188 integrally formed with its lower end. A washer 190 surrounds the inlet 152 and separates the flange 188 and the female threaded portion 172 of the lid 150.

Having described the inlet 152 and cork means 154 of the reservoir means, their use may now be readily understood. When it is time to install a full bottle of liquor, the cap is taken off the bottle in the normal fashion with the bottle upright. Next the corresponding lid, inlet and cork means assembly such as that shown in FIG. 9 is removed from its corresponding chamber and inverted. The sleeve 186, the portion of the inlet 152 which it surrounds, and the valve head end of the plunger valve are inserted into the spout of the bottle. The person then rotates the disk portion 166 of the lid relative to the inlet portion 152 and the sleeve 186, holding the washer 190 with the fingers if necessary. The disk portion 166 is rotated in a direction so that it screws toward the sleeve 186. The sleeve 186 is squeezed axially between the washer 190 and the retaining flange 192 at one end of the inlet 152. This causes the sleeve to deform to the shape shown in phantom lines in FIG. 9, thus providing a liquid tight seal between the spout of the bottle and the inlet. At this time, the plunger valve will be in its position shown in solid lines in FIG. 9 in which it seals the inlet. The liquor bottle can thus be inverted and the plunger valve will prevent any of the liquor from escaping through the inlet.

As shown in FIG. 7, the now joined liquor bottle 54 and lid assembly are placed in position in the corresponding chamber 50. The end of the valve stem 176 engages the solid portion 194 of a filter screen element 196 within the body portion 148 of the chamber 50. This moves the valve stem 176 upwardly in FIG. 7 and permits liquor within the bottle 54 to drain through the open space 198 (FIG. 10) in the inlet 152 and into the chamber 50. The peripheral edges of the disk shaped screen element 196 are supported by a ledge portion 200 of the chamber 50. When the liquor drains from the bottle 54 into the chamber 50, it fills the body portion 148 of the chamber to a level just equal with the lower end of the inlet 152 in FIG. 7. Thereafter, no more liquor from the bottle 54 drains into the chamber until liquid is drawn from the chamber by the corresponding pump. At that time, air passing between the lid 150 and the lip 156 flows upwardly through the inlet 152 to allow liquor in the bottle to drain downwardly into the chamber, once again filling it to the level of the lower end of the inlet 152. Once the liquor bottle 54 is empty, the level of the liquor within the chamber 50 gradually drops from the level of the lower end of the inlet 152 until the chamber is empty as liquor is pumped from the chamber.

Details of the float switch 58 (FIG. 1) which permits the central control terminal to determine when a particular brand of liquor has been almost depleted are visible in FIG. 7. It will be understood that the float switch 58 merely indicates when a particular bottle 54 and the chamber into which it drains are empty, however at this time some quantity of that type of liquor will still remain in the various flow lines leading to the dispensing gun. Nevertheless, to avoid undesirable effects of pumping air through the system, the central control terminal sends an empty signal to the dispensing gun causing the corresponding LED 96 to flash. At the same time, the central control terminal disables the pump corresponding to that brand of liquor to prevent undesirable effects of pumping air. If air gets into the pump or flow lines, it can cause sputtering. It can also cause pour size volume inaccuracies since air will be pumped instead of liquid.

The cup-shaped body portion 148 of each of the chambers 50 has an upwardly extending hollow projection 202 formed in its bottom wall. A reed switch 204 is mounted within the hollow projection.

The leads 206 of the reed switch 204 (FIG. 7) are connected to the central control terminal. An annular float 208 surrounds the projection 202 within the body portion of the chamber and vertically reciprocates up and down around the projection as the level of liquor within the chamber varies. The float encloses a magnet 210 and buoyantly supports the magnet for up and down reciprocation as the level of liquid varies. When the chamber is almost empty of liquid, the position of the magnet is such that it closes the reed switch, and this in turn causes the central control terminal to send a restock signal to the dispensing gun which causes one of the LEDs to flash on and off. At the same time the central control terminal disables further energization of the pump motor corresponding to that reservoir.

FIG. 7 further illustrates the manner in which one or more reservoirs may be connected to one of the pumps. It will be understood that in FIG. 7 both of the liquor bottles 54 contain the same brand of liquor and the chambers 50 into which they empty are connected to a single one of the pumps. This pump in turn pumps the liquor separately to one dispensing gun. This ganged arrangement of multiple bottles of the identical brand of liquor permit popular brands to be dispensed for longer durations before empty bottles have to be replaced.

It is desirable that ganged bottles of the same brand of liquor empty sequentially. This eliminates the dilemma, for example, of having four almost empty Scotch bottles. Laws prohibit marrying or rebottling, i.e., the pouring of partially empty bottles together, one into another. Sequential emptying of ganged bottles is accomplished by forming the inlets 152 of ganged reservoirs with progressively higher individual vent holes such as 211 shown in phantom lines in FIG. 9. The same result could be accomplished by progressively shortening the lengths of the inlets 152. This eliminates the necessity of having tiered reservoirs.

Figure 11:
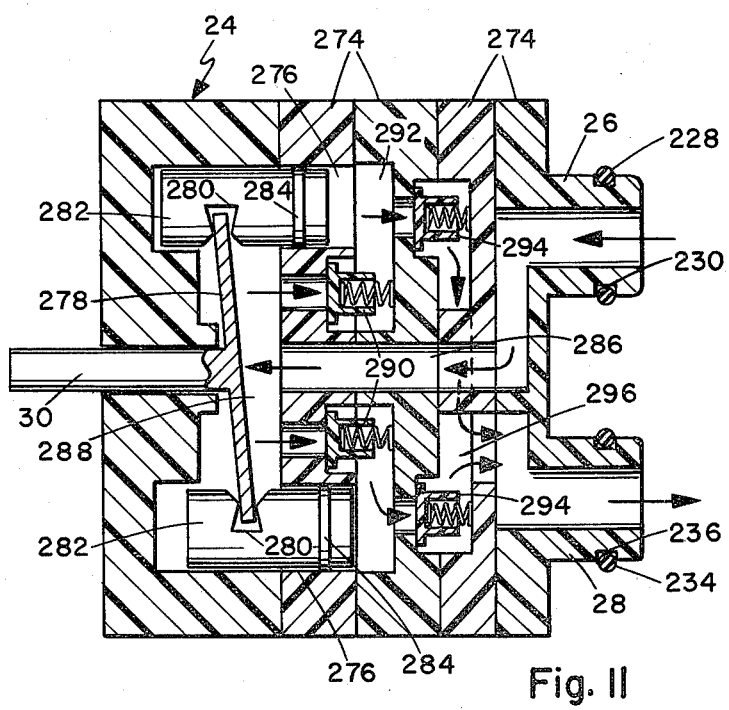
FIG. 11 is a diametrical sectional view of a simplified form of one of the positive displacement pumps of the system.

Each of the chambers in FIG. 7 is provided with an outlet 212 which extends from its bottom wall. An internal tubular connector 214 having O-rings seals or washers 216 at its opposite ends is used to couple the outlet 212 with an elbow fitting 218. A sequence of interconnected unions 220, straight pipe segments 222 and a T-connector 224 connect the elbow 218 to another elbow 226. The elbow 226 is in turn connected to a socket or straight pipe segment 227 into which the inlet 26 of the corresponding pump is inserted. As shown in FIG. 11, the inlet 26 is surrounded with an O-ring 228 which seats in a groove 230 formed in the periphery of the inlet. The O-ring 228 provides a liquid tight seal between the inlet 26 and the inner wall of the straight pipe 228 (FIG. 7). Similarly, the outlet 28 of the corresponding pump 24 also fits within another socket or pipe segment 232. As shown in FIG. 11, the outlet 28 also has an O-ring 234 which surrounds the same and which is seated in a groove 236 formed in the outer periphery of the outlet 28. The O-ring 234 provides a liquid tight seal between the outlet 28 and the pipe segment 232.

Figure 8:
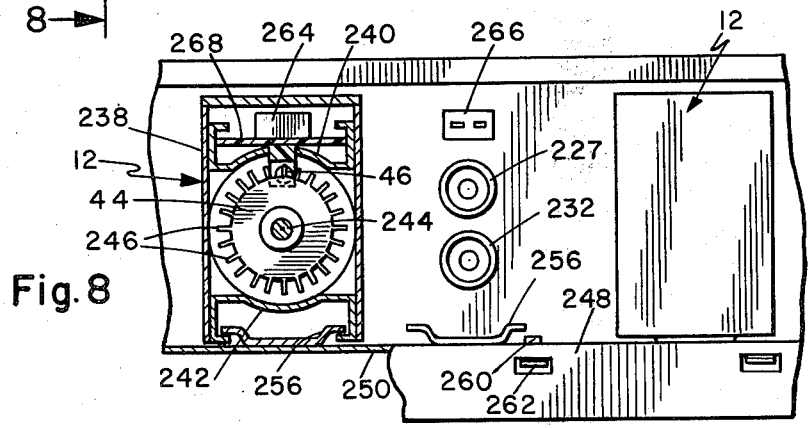
FIG. 8 is a fragmentary sectional view taken along line 8—8 of FIG. 7.

Each of the pump modules 12 includes a rectangular metal box 238 (FIGS. 7 and 8). The motor 32 and pump 24 are mounted in spaced apart axial alignment between upper and lower brackets 240 and 242 attached to the side walls of the module box 238. The chopper wheel 44 provides the driving connection between the output shaft 244 of the motor (FIG. 7) and the pump drive shaft 30. The teeth 246 (Figure) of the chopper wheel 44 rotate between the beam emitter 46 and the detector 48 (FIG. 7).

The different pump modules 12 are horizontally spaced along a removable pump shelf 248 supported by the rack 164 beneath the liquor shelf 160 (FIG. 7). The pump shelf 248 includes a horizontal planar support 250 and a vertical back wall 252. The straight pipe segments 227 and 232 extend through upper and lower holes in the back wall 252 of the pump shelf and are held in position by fittings 254. A plurality of track elements 256 (FIG. 8) are mounted to the planar support 250 of the pump shelf at horizontally spaced locations along the same. The lower brackets 242 of each of the pump modules engage corresponding ones of the track elements 256 so that a pump module can be slid to the right to its fully inserted position shown in FIG. 7.

When a pump module is slid into position, its inlet 26 and outlet 28 couple with the pipe segments 227 and 232 (FIG. 7) to establish a liquid tight connection. A spring retaining clip 258 attached to the bottom of the pump shelf has a tooth 260 (FIGS. 7 and 8) which snaps into an appropriately positioned slot in the lower flange of the lower bracket 242. The clip 258 holds the pump module in its inserted position. The pump module may be easily removed for service or replacement by manually depressing the outer end 262 (FIG. 7) of the retaining clip to pull the tooth 260 clear of the bracket 242, permitting the box 238 containing the pump and motor to be withdrawn. The inlet 26 and the outlet 28 of the pump slideably disengage from the pipe segments 227 and 232.

Mating male and female electrical connectors 264 and 266 (FIG. 7) are provided for allowing quick connection and disconnection of the motor leads and the leads of the beam emitter 46 and detector 48. The male connector 264 is mounted to the upper side of a PC board 268 mounted horizontally between the side legs of the upper bracket 240 (FIG. 8). The female electrical connector 266 is mounted in an aperture formed in the back wall 252 of the pump shelf directly above the pipe segments 227 and 232. When the pump module 12 is slid into position, simultaneous fluid and electrical connections are made.

Numerous liquor shelves and pump shelves can be added so that the system can serve the desired number of brands of liquor at the desired number of stations. By way of example, the system can be configured to dispense sixty brands of liquor to eight bar stations. The central control terminal has sufficient processing capability to handle many stations. The dispensing guns and pumps are monitored and actuated on a time share basis.

The pipe segment 232 (FIG. 7) which receives the outlet 28 of the pump has a cylindrical connector 270 connected thereto. This cylindrical connector has an internal bore which is conformably shaped for detachably receiving one end of one of the flow lines 16 (FIG. 1) which is secured in place with one of the retainer clips 128. The other end of the flow line is similarly connected to a cylindrical coupler 118 utilizing another retainer clip 128. There are a plurality of the cylindrical couplers 118 which are screwed into a single block 272. The block 272 and couplers 118 comprise the first manifold assembly 36 (FIG. 1). The couplers 118 screwed into the block 272 have one way check valves mounted therein like the couplers 118 of the second manifold assembly 40 (FIG. 6). The upstream ends of the flow lines 38 are held in corresponding holes in the other side of the block 272 (FIG. 7) by additional retainer clips 128. The holes on the side of the block 272 opposite from the coupler are configured for removably receiving the clips 128 and the upstream ends of the flow lines 38.

FIG. 11 is a simplified view illustrating the construction of one of the positive displacement pumps 24. The pump includes a housing comprised of a plurality of laminated disks 274 of plastic such as that sold under the trademarks CELCON or DELRIN. These disks may be injection molded and have various recesses and passages formed therein. When the disks are held in laminated, stacked configuration, they define the various cylinders, chambers and ports of the pump. As previously mentioned, the positive displacement pump may be of the axial piston type. The laminated disks 274 define a plurality of circumferentially spaced cylinders 276 aligned with their axes generally parallel and in alignment with the axis of the pump drive shaft 30.

A swash plate 278 (FIG. 11) is secured to the inner end of the pump drive shaft so that its plane is offset from ninety degrees with respect to the axis of the shaft. The outer periphery of the swash plate engages slots 280 formed in pistons 282. In the commercial embodiment of the present invention, there are four such pistons, each being reciprocated back and forth in a corresponding cylinder 280 by rotation of the swash plate 280 through driving of the shaft 30. Each of the pistons is surrounded by a resilient O-ring 284 which provides a liquid tight seal between the piston and the cylinder wall.

During powered rotation of the pump drive shaft 30, liquid from a corresponding one of the reservoirs 14 is sucked through the pump inlet 26 as indicated by the arrow in FIG. 11. The liquid flows through a central inlet passage 286 and into a chamber 288 within which the swash plate 278 rotates. As the upper one of the pistons 282 reciprocates to the left, liquid is sucked through a spring biased check valve 290 into a chamber 292 and the upper cylinder 276. When the upper one of the pistons 282 reciprocates back to the right in FIG. 11, the liquid within the chamber 292 and the cylinder 276 is forced through another check valve 294 into a common discharge chamber 296 and out of the pump through the outlet 28. The other pistons and cylinders operate similarly, each staggered ninety degrees in phase.

It is important to note that the slip efficiency of this type of pump is very high. In other words, very little liquid can flow past the O-rings 284 surrounding the pistons or back through the check valves in the pump. Additionally, in the commercial embodiment of the present invention, the diameter of the cylinders 276 is only a few millimeters. The stroke of the pistons is also only a few millimeters. Therefore, it is possible to pump only a few drops of liquor by rotating the pump drive shaft through, for example, twelve degrees. Additionally, in the commercial embodiment of the present invention, the pump drive shaft 30 is rotated at high speed, for example 2,000 rpm, so that there is a very uniform delivery of liquid without spurting or pulsing. The majority of the pump components may also be made of the same plastic materials as other components described herein.

Having described the mechanical aspects of a preferred embodiment of our liquor metering and dispensing system, the overall operation of the system may now be described in conjunction with a description of the electronic control circuitry contained in the central control terminal 10. For the sake of simplicity, the system initially described hereafter will have only one station, i.e., a single dispensing gun 18. As previously indicated, both the number of stations and the number of brands of liquor may be increased to meet the requirements of a particular establishment. The size to which the system may be expanded is limited only by the processing capabilities of the central control terminal. It provides the intelligence for the system and executes the various bartending functions. By way of example, a basic form of the system may include four dispensing guns each capable of dispensing twelve different brands of liquor. However, the system can easily be expanded to dispense sixty brands of liquor to eight bar stations. The liquor may be dispensed in virtually any pour size volume, however, typically four pour size volumes are key programmed into the central control terminal and are selected through manual actuation of the switches on the dispensing guns. In addition to the basic liquid metering and dispensing functions, the system also provides total liquor inventory control and revenue accountability.

The central control terminal utilizes microprocessor based circuitry for controlling the positive displacement pumps. The pulse signals representing movement of a pump shaft are counted. This closed loop feedback method of control provides the capability for achieving very high accuracy of pour size volume. It also permits a virtually unlimited range of pour size volumes. Furthermore, it provides the capability for having several standard portion sizes preprogrammed into the system and available upon command.

The preferred embodiment of the system includes a key operated mode switch 72 (FIG. 1) located on the front panel of the central control terminal 10. Four separate modes of operation may be selected, namely an OPERATE MODE, a PROGRAM MODE, a DIAGNOSTIC MODE and a SPECIAL MODE. These modes are selected by rotating the key in the switch 72 until its plane is aligned with corresponding indicia on the front panel 62 representing the desired mode of operation.

When the system is placed in its OPERATE MODE, the central control terminal 10 continuously monitors the level of liquor in the chambers 50 (FIG. 1) for each brand of liquor. The empty/full status for each brand of liquor is communicated to the gun scanner 20 by the central control terminal 10. This information is then encoded and sent to the dispensing gun 18 and is displayed on the LEDs 96 (FIG. 4) mounted in the switch module 88 on the upper side of the gun case.

In the preferred embodiment of the system, there are six liquor brand switches 80 in the switch module 88. When the chambers 50 corresponding to the first six brands of liquor are non empty, the six LEDs adjacent the brand selection buttons 180 are illuminated, the light being visible to the user through the various semi-transparent layers of material in the switch module 88. In order to find the empty/full status of the remaining six brands of liquor, the bartender depresses the SHIFT button (FIG. 3) on the dispensing gun 18. A message is sent to the central control terminal 10 by the gun scanner 20. The central control terminal then sends a message relative to the empty/full status for liquor brands 7-12 to the gun scanner for display by the LEDs in the switch module. When a brand of liquor has been depleted, the float switch 58 corresponding to that brand sends a signal to the central control terminal which determines that that brand has been depleted. The central control terminal then causes the associated LED on the dispensing gun to flash, signalling the bartender that that brand of liquor has been depleted and that it is time to restock the same.

Referring again to the dispensing gun buttons 108 in FIG. 3, the buttons labeled SHORT and LONG are used to command the dispensing of a short portion of liquor, or a long portion of liquor respectively. This is accomplished by depressing either of these buttons prior to depressing the desired brand selection button. If neither one of the SHORT or LONG buttons is depressed prior to depressing a brand selection button, a regular pour size volume, for example one ounce of liquor, will be dispensed.

The sequence for dispensing liquor when the system is in its OPERATE MODE will now be described in greater detail. By way of example, assume that the bartender desires to dispense a short portion of brand 11. The bartender first depresses the SHORT button. This information is sent via the gun scanner 20 along associated data transmission cables to the central control terminal 10. The central control terminal then responds by sending a message back to the gun scanner to illuminate the LED adjacent the SHORT button on the dispensing gun. The bartender then depresses the SHIFT button. Likewise, this data is sent to the central control terminal which sends back to the dispensing gun a message which causes the LED adjacent the SHIFT button to be illuminated. The bartender then depresses the brand selection button corresponding to brand 11. Once again the data is sent via the gun scanner 20 to the central control terminal 10 which responds with a message back to the dispensing gun causing the LED adjacent the brand selection button for brand 11 to be extinguished. Concurrently, when the brand selection button information is received at the central control terminal, it determines if there is liquor in the chamber for brand 11. If there is liquor, the central control terminal then scans its internal memory to find the applicable portion size, in ounces, for a short portion of brand 11. This amount of liquor is then added to an internal accumulator memory which maintains accounting information relative to liquor inventory.

Next, the central control terminal scans its memory and finds the associated price for a short portion of brand 11, and it adds this price to its cash accumulator memory for brand 11. The central control terminal calculates the number of revolutions, and/or fractions thereof, of the pump motor necessary to dispense the short portion of liquor. The central control terminal does this by determining the number of pulses that it should receive from the detector 48 (FIG. 1) in order for the short portion of liquor to be dispensed. The central control terminal energizes the appropriate pump motor 32 which in turn begins to rotate the pump drive shaft 30. When the pump motor begins to turn, pulse signals from the detector 48 are transmitted over appropriate data transmission lines to the central control terminal. In addition, liquor from the chamber 50 associated with the selected brand of liquor is pumped through the flow lines 34 and 16 forcing an equal amount of liquor which is already upstream in the flow lines 38 and 41 to be discharged from the dispensing gun.

As the pump drive shaft 30 rotates, the central control terminal counts the pulse signals representing predetermined amounts of angular rotation of the pump drive shaft. These pulse signals are generated as a result of the teeth of the chopper wheel 44 repeatedly intercepting the beam which extends between the beam emitter 46 and the detector 48. When the central control terminal determines that the count of pulse signals equals the count in its memory corresponding to a short portion of liquor, the central control terminal de-energizes the pump motor 32, thus terminating the discharge of liquor from the dispensing gun.

In the commercial embodiment of the present invention, when the pulse signal count gets near the total number of pulse signals representative of the selected pour size volume, the central control terminal gradually decreases the motor speed to prevent overshoot of the pump and therefore delivery of more liquor than is desired. In other words, the system compensates for the inertial momentum in the pump motor, chopper wheel and pump. Finally, the central control terminal sends a message through the gun scanner to the dispensing gun to once again illuminate the LED associated with the brand 11 selection switch.

When the system is in its OPERATE MODE, the central control terminal continuously monitors the liquid level for each brand of liquor. In addition, the central control terminal also monitors each pump motor to determine whether the motor is running. If the central control terminal detects the inadvertent running of a pump motor when the motor has not been commanded to run, it will send a signal to the pump motor power supply associated with that pump motor to remove the power. This feature prevents a faulty pump motor and associated drive electronics from depleting the supply of liquor for any particular brand.

If there is a malfunction with respect to one of the pump motors, the central control terminal will send a message to the dispensing gun to flash all of the LEDs contained in the switch module. This signals the bartender that a malfunction has occured. In the event that the central control terminal commands a pump motor to run, and a malfunction in the pump prevents rotation of the pump drive shaft, the central control terminal will sense this malfunction and immediately disable the pump motor. This prevents the motor from burning out. The central control terminal will then record the malfunction in its internal error accumulator memory for later use by a service technician. The bartender will become aware of a malfunction of this type in that the appropriate LED will be extinguished for approximately one-half of a second, and little or no liquor will be dispensed from the gun.

The accounting functions of the system will now be described. As previously mentioned, all liquor dispensed by the system is accounted for by the central control terminal. In order to interrogate the system and generate reports, the operator inserts the special key into the mode switch 72 (FIG. 1) on the front panel of the central control terminal. The key is rotated to a special read position. When in this condition, the central control terminal will continue to dispense liquor on command along the lines previously discussed. In addition, the central control terminal will accept input on the keyboards 64 and 66. Since all the data relative to the liquor dispensing transactions is stored in the central control terminal, a variety of reports can be generated. Therefore, the particular types of reports generated by a particular system may be custom tailored at the time of manufacture or installation to accommodate the customer's application and accounting scheme.

By way of example, a command called Inquiry One may generate a Total Cash Report. To generate the Total Cash Report, the operator enters into the keyboards 64 and 66 the Inquiry One command. Upon receipt of the command, the central control terminal scans its internal memory and causes the report to be printed on the paper 76 itemizing the total amount of cash that should have been received for each brand of liquor.

Another report useful to the proprietor may be referred to as a Usage Report. This report is a summary of the volume of liquor dispensed by the system, for each brand of liquor. To generate this report, the operator enters the applicable inquiry command through the keyboards 64 and 66. The central control terminal scans its memory and causes the report to be printed on the paper 76.

Another report which is useful to the proprietor may be referred to as a Detailed Report. This report itemizes the number of pour size volumes dispensed for each brand, the total number of ounces and liters, as well as the total amount of revenue that should have been received for each brand of liquor. This report is further broken down by bar station, thus enabling a bar manager to determine the efficiency of his or her various bartenders.

The PROGRAM MODE of operation of the system will now be described. When in this mode, the central control terminal disables all liquor dispensing functions. The operator can place the system into the PROGRAM MODE by inserting the special key into the mode switch 72. The key is rotated to the PROGRAM MODE position. The central control terminal then alerts each bar station that the system is disabled, by sending a message to each dispensing gun via the gun scanners to cause all of the brand associated LEDs in the switch modules to flash. In the PROGRAM MODE, the operator is permitted to change both the pour size volumes and the associated prices for each brand of liquor. This information is entered through the keyboards 64 and 66, the various data being displayed on the display 68. In order to re-program the various portions sizes for a particular brand of liquor, the operator enters a pour size volume inquiry command using the keyboards 64 and 66, along with the brand number and the portion type, i.e., SHORT, STANDARD or LONG. The central control terminal responds by displaying the current pour size volume on the display 68. The operator then enters the new pour size volume through the keyboards. Upon receipt of the new pour size volume, the central control terminal will generate through its printer on the paper 76 the amount of liquor dispensed according to the old pour sizes, as well as the total amount of cash received for those old portion sizes. Upon completion of the print out, the central control terminal will then change its internal memory to reflect the new pour size volumes for the associated portion sizes, i.e., SHORT, STANDARD or LONG. From this point on, the pour size volume for that particular brand of liquor will be dispensed upon command.

As with pour size volume, the price may be changed by the operator in a similar fashion. The operator enters the inquiry command to change the price for a given brand and pour size volume. The printer then generates a report itemizing the current inventory and cash data for the old price. Upon completion of the print out for that particular brand of liquor, a new report will be generated indicating the new price. This method of keyboard programming allows the user to quickly change both pour size volume and prices for any and all of the brands of liquor. This is to be contrasted with prior art liquor dispensing systems which often require meticulous adjustment of mechanical switches, valve screws, sensors, air pressure or piston stroke in order to change a given portion size.

The DIAGNOSTIC MODE of operation of the system may now be described. In this mode, the central control terminal signals the bar stations that the system is disabled, in the same fashion as was done in the PROGRAM MODE. The DIAGNOSTIC MODE is primarily a diagnostic test mode. It provides the user with various inquiry commands to test the system. Using the various inquiry command, the user can fault isolate a problem or malfunction to a given module within the system. Also, in the DIAGNOSTIC MODE, the user may interrogate the internal error registers by entering the applicable inquiry command through the keyboards. The central control terminal then prints the contents of the error registers on the paper 76. The error registers are used to isolate faults and malfunctions to a specific module or subassembly within the system.

The SPECIAL MODE of operation of the system will now be described. This mode is very similar to the OPERATE MODE in that all dispensing functions are enabled and all report generating functions are disabled. The SPECIAL MODE is selected by inserting the key within the switch 72 and rotating it to the appropriate position. This automatically shifts the pour size volumes for the SHORT, STANDARD and LONG portions and may also automatically shift the pricing for each, according to each separate brand of liquor. This enables the proprietor to quickly shift the pour size volumes and pricing so that regular bar hours, Happy Hours, and entertainment hours can be quickly accommodated.

Preferably, the central control terminal also includes a serial data port which may be connected to a remote terminal for allowing the user to change system operating modes, generate printed reports, perform diagnostic tests and program functions, all from a remote location. This feature is very useful to proprietors of restaurant chains in which each restaurant has the system of the present invention installed. The serial data port of each such system may be coupled to a MODEM. The proprietor may communicate with each system over the telephone lines utilizing a remote host computer. This host computer can be programmed to collect data from each system, consolidate the data and provide the proprietor with a total cash accountability and inventory control for all of his or her establishments.

Figure 12:
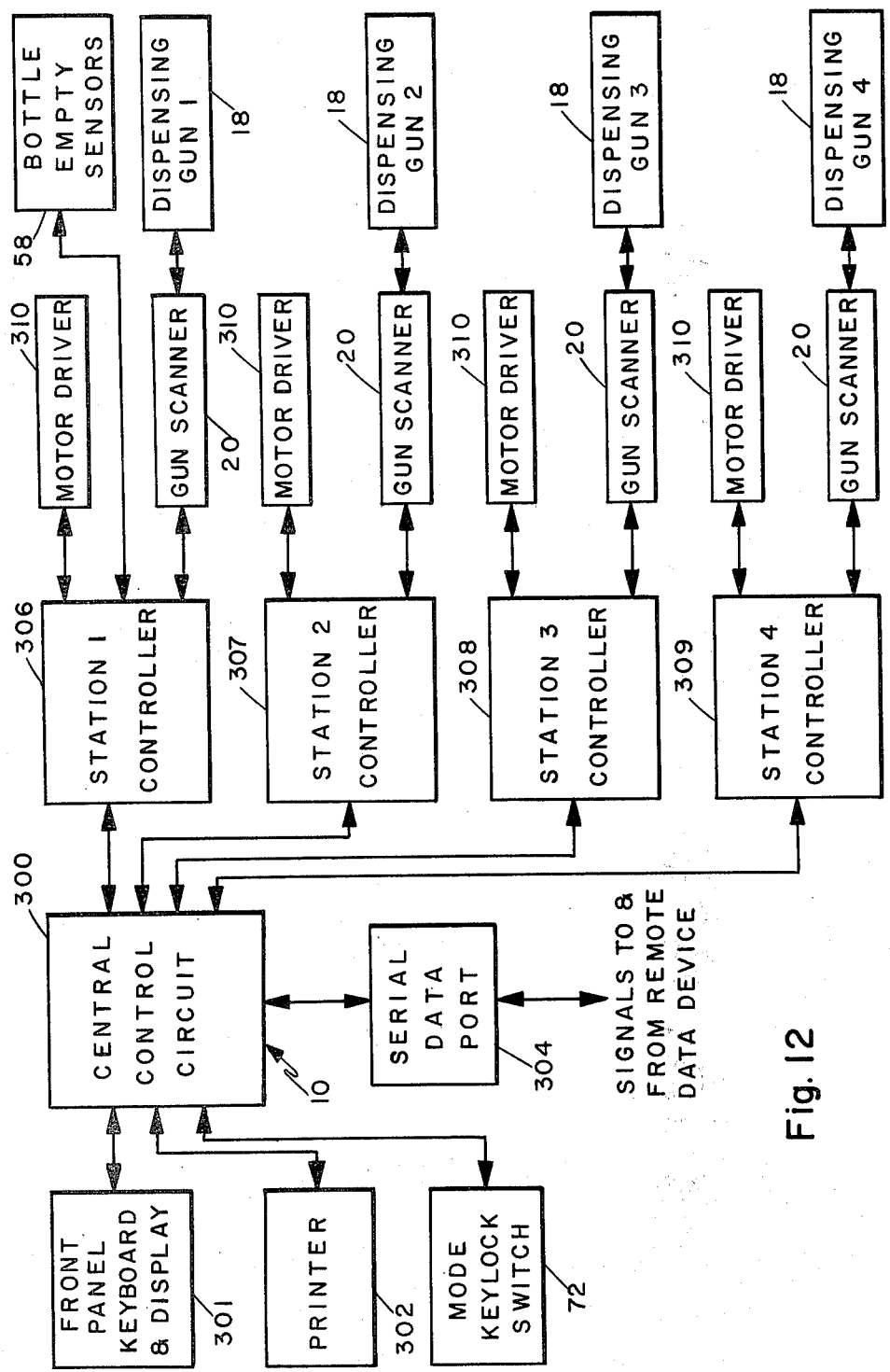
FIGS. 12–15 are functional block diagrams illustrating the control circuitry of the system of the present invention.

Electronic circuitry of the central control terminal 10 will now be described. FIG. 12 illustrates a functional block diagram of the overall architecture of an embodiment of the system configured to serve four separate bar stations. A central control circuit 300 communicates with and controls a front panel module 301, a printer module 302, the mode switch 72, a serial data port 304, and four separate station controller modules 306-309. Each of the station controller modules in turn receives signals from the float switches or bottle empty sensors 58. Furthermore, each of the station controller modules also communicates with and controls a motor driver module 310 and a gun scanner circuit 20. The gun scanner circuits in turn are coupled to corresponding ones of the four dispensing guns.

The front panel module 301 (FIG. 12) comprises the keyboards 64 and 66, the display 68 and the associated decoder and drive circuitry. This module provides a means of communication between the user and the system. As previously described, the user can request the generation of reports, program pour size volumes and prices, and perform system diagnostics by depressing the applicable keys on the keyboards 64 and 66. The control circuit 300 in turn communicates with the user by displaying alphanumeric data relating to system status, price and portion sizes, on the display 68. By way of example, this display may be eleven digits in length and may comprise LED matrix chips or LCD chips.

The printer module 302 contains a printer for generating hard copy printouts of accounting information and other data on the paper 76 fed out of the slot 72 on the front control panel (FIG. 1). By way of example, the printer may be a twenty column thermal printer such as Model PU1800 manufactured by Olivetti Corporation. Also included in the printer module are the associated decoder and drive electronics for the printer, such as Model EM1800 unit for the aforementioned Olivetti printer. Basically, the printer module responds to commands from the control circuit 300 to generate hard copy reports which have been requested by the user. The commands from the control circuit 300 direct the printing on a line by line basis.

The central control circuit 300 interrogates the key operated mode switch 72. Upon sensing a mode change, the central control circuit commands the various modules to operate in accordance with the newly selected mode.

The serial data port 304 may be a type RS232. It provides an alternate means of communication with the system as described above. The user may connect a printing data terminal such as a Silent 700 Model 743 manufactured by Texas Instruments, and from a remote location generate system reports, change pour size volumes and prices, and perform system diagnostics. Likewise, a proprietor with multiple liquor dispensing systems may choose to connect a host computer in place of the aforementioned printing terminal. The host computer may be programmed to collect the reports from the various systems and provide the proprietor with total cash and inventory accountability. Commands are received by the serial data port from the remote data terminal or host computer and are communicated to the central control circuit 300. The central control circuit 300 then responds to the commands by performing the requested function and communicating the results to the data terminal or host computer through the serial data port.

Each of the station controller modules 306-309 provides a communication link between the central control circuit 300, a corresponding one of the gun scanners 20, a corresponding one of the motor driver modules 310 and the bottle empty sensors 58. In response to commands from the central control circuit, each station controller module receives messages from its dispensing gun via the associated gun scanner, relative to the pour size volume and brand of liquor to be dispensed. Likewise, the station controller module sends messages through the gun scanner to the dispensing gun to provide a visual indication of the brand of liquor being dispensed, as well as a visual indication of the empty/full status of each brand of liquor.

Each of the station controller modules 306-309 (FIG. 12) also communicates with a corresponding motor driver module 310 by sending signals to cause the pump to turn and dispense the selected pour size volume of liquor. The station controller module also receives signals from the motor driver module relative to the position of the pump drive shaft, hence providing the central control circuit 300 with positive feedback as to the relative amount of liquor being dispensed. In response to commands from the central control circuit, the station controller module can also cause the pump motor to slow down just prior to stopping, thus minimizing over pour. The station controller module receives signals from the bottle empty sensors 58 relative to the empty/full status for each brand of liquor. These signals are communicated to the central control terminal.

Figure 13:
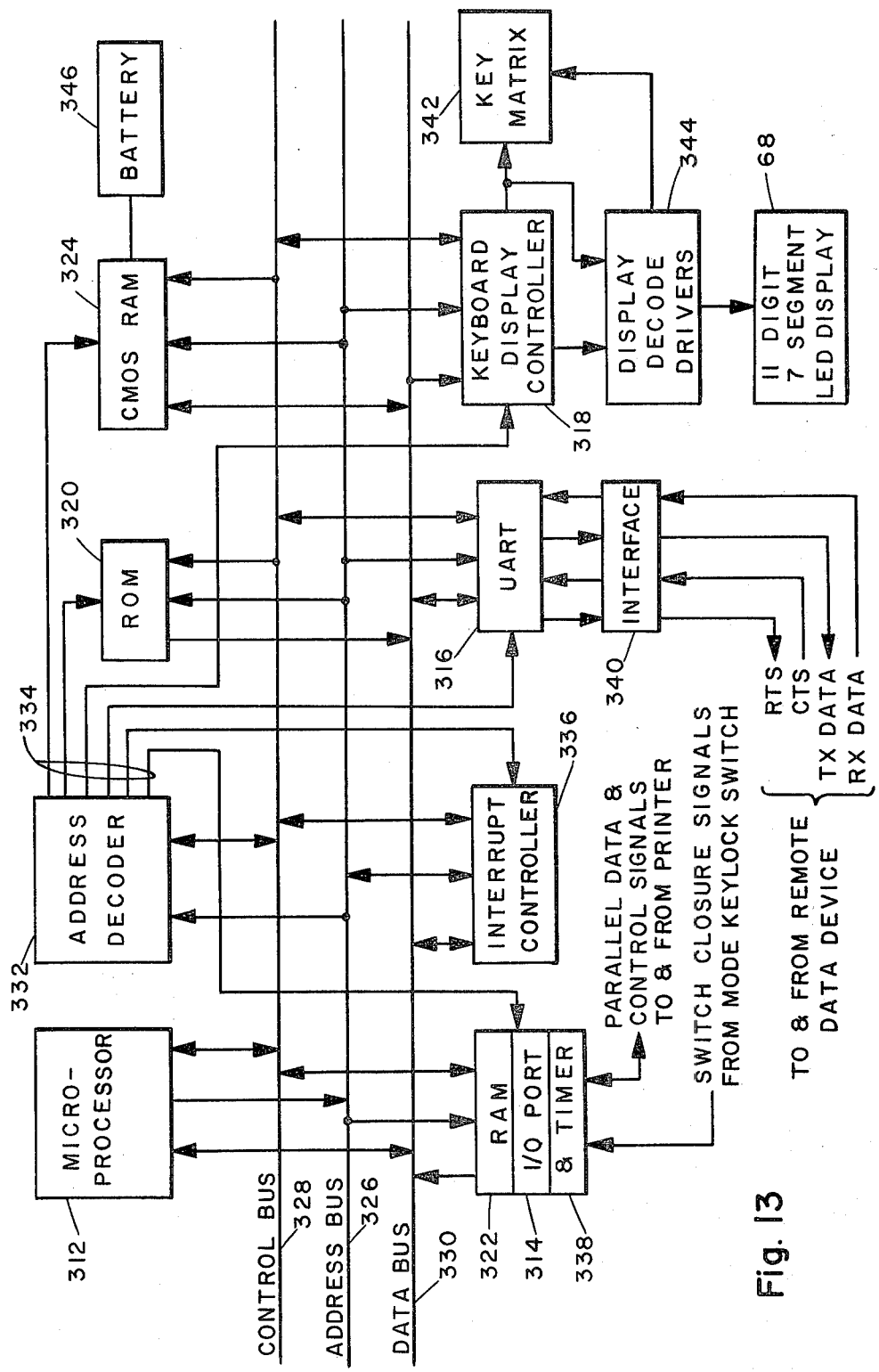

As indicated above, all of the intelligence for the central control terminal 10 is included in the central control circuit 300 (FIG. 12). The functions and controls within the system are initiated and controlled by the central control circuit, a functional block diagram of which is illustrated in FIG. 13. The central control circuit includes a microprocesor 312, a plurality of input/output devices 314, 316, and 318, an instruction memory in the form of a ROM 320, a scratch pad or working memory in the form of a RAM 322, and a non-volatile data memory in the form of a CMOS RAM 324. Communication with the microprocessor and the various input/output devices is provided by means of an address bus 326, a control bus 328, and a data bus 330. By way of example, the address bus may be sixteen bits wide, the data bus may be eight bits wide and the control bus may contain a plurality of bits such as clocks as necessary to control the system.

In the commercial embodiment of the present invention, the microprocessor 312 (FIG. 13) is an Intel 8085 microprocessor. The address bus in conjunction with the control bus provide a means for selecting each of the input/output devices and the various memory devices. The address bus is decoded by an address decoder 332 via select lines 334. This decoder provides select signals to various elements in the system. The data bus is used to transmit data to and from the microprocessor with respect to the various memory and input/output devices. The ROM 320 comprises 2716 type read only memories which contain the instructions that the microprocessor 312 executes. These instructions are executed in various sequences necessary to carry out all the functions of the system. In addition, the ROM 320 contains various parameters associated with the system for a given installation. For example, these may include the name of the establishment, which is printed on each report. A representative listing of the source code and data contained in the ROM 320 is set forth in the seventy-three page computer program source listing entitled METRUM CORPORATION LIQUOR DISPENSOR PROGRAM. Copyright in and to this source listing program is owned by Romaine R. Maiefski, one of the co-inventors of the subject invention. See copyright Registration No. 86-713.

Continuing with FIG. 13, the RAM 322 may be a type 8155 RAM. It contains the working registers of the system as well as a scratch pad memory for the various calculations performed by the microprocessor. The input/output port 314 is used to communicate data and control signals to and from the printer module 302 (FIG. 12), eight bits of which are data and two bits of which are for control. The remaining port is a six bit port used to sense signals from the mode switch 72 (FIG. 1) to determine the selected mode of operation of the system.

An interrupt controller module 336 (FIG. 13) provides an interface between the various input/output modules and the microprocessor to interrupt the microprocessor's normal instruction sequence. The module 336 may comprise a type 8159 interrupt controller chip. The interrupts that are used within the system are from the detectors 48 (FIG. 1) adjacent the chopper wheels, the gun scanner data communications port, the control panel keyboards and a real time clock 338 for controlling the timing functions within the system. The interrupt request lines are part of the control bus. The input/output device 316 comprises a universal asynchronous receiver transmitter (UART). It provides, in conjunction with the microprocessor, serial communication to an external data device via an interface 340. One suitable UART is a type 8251 chip. The serial data, along with the control signals "request to send" and "clear to send" are level shifted by TTL TO RS232 interface chips, types 1488 and 1489, providing RS 232 interface signals to and from a remote data device.

The input/output device 318 is preferably a keyboard and display controller chip such as type 8279. It receives commands from the microprocessor over the control, address and data buses. The chip 318 provides the necessary electrical interface for the keyboard matrix 342 which includes the keyboards 64 and 66. The keyboard display and controller chip 318 also provides binary coded decimal signals and select lines which are decoded by the display decode and driver module 344. These signals are sent to an eleven-digit, seven-segment display 68.

The RAM 324 is preferably implemented utilizing type 5114 CMOS RAMs. CMOS RAMs are preferred because of their lower power dissipation. In the event of a power failure, a battery 346 provides power to the RAM 324 for data retention. The RAM 324 contains all the data collected by the system as well as the programmed pour size volumes and prices for each brand of liquor.

Figure 14:
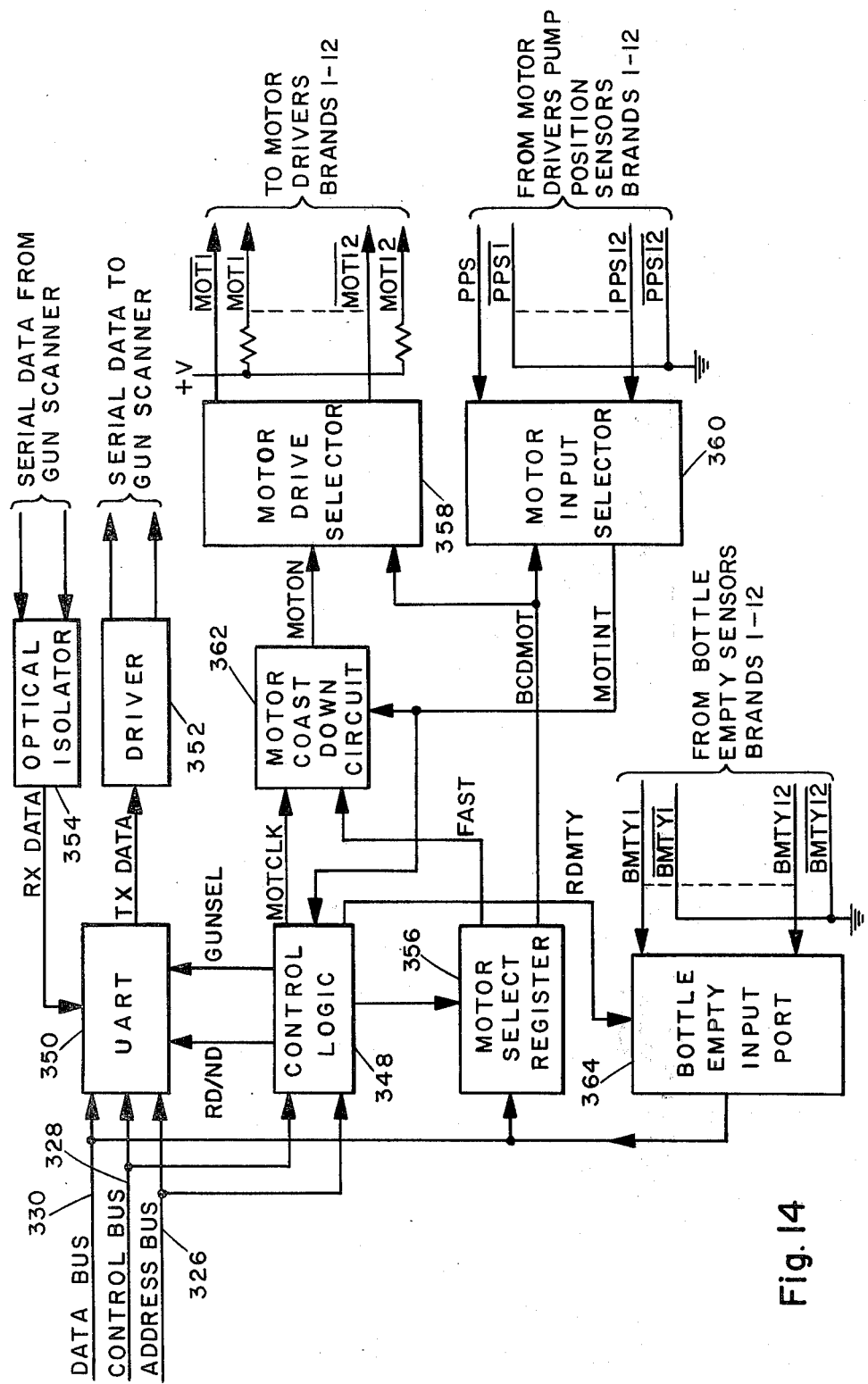

FIG. 14 illustrates a functional block diagram of one of the station controller modules 306-309 (FIG. 12). As shown in FIG. 14, the station controller module is an input/output device which communicates with the microprocessor over the data, address and control buses. Control logic 348 decodes the address and decides what function is to be performed. The microprocessor 312 (FIG. 13) communicates with the gun scanner 20 by outputting the address of UART 350 on the address bus, and associated data on the data bus for serial communication between the station controller module and the gun scanner. The data on the data bus is latched in the UART 350, serialized and transmitted through a driver 352 to the remote gun scanner. The UART 350 may be a type 8251 UART chip.

Continuing with FIG. 14, data received from the gun scanner is received by an optical isolator 354 and inputted to the UART 350 where it is changed from serial to parallel data. Upon receiving the data, the UART 350 generates an interrupt and outputs it throught he control bus to interrupt the microprocessor. The microprocessor then selects UART 350 by outputting the applicable address. The data received by the UART 350 is then read on the data bus. The microprocessor commands the various pump motors to operate by outputting the applicable address on the address bus, while the data bus contains the BCD equivalent of the pump motor to be turned on. The control logic 348 decodes the address and stores the BCD value for the pump motor in the motor select register 356. The BCD output of the motor select register 356 is sent to the motor driver selector module 358 which is basically a four to sixteen line decoder such as a type 74LS159 type chip, which in turn sets one of the motor signals to the zero state. In addition, the BCD motor signal is also sent to a motor input selector module 360. The motor input selector module 360 is implemented with a 74150, one of sixteen data selector.

The motor input selector module 360 steers the applicable pump position sensor to the control logic 348, and to the control bus as a motor interrupt. Just prior to stopping the motor, the microprocessor outputs a data word to the station controller to set the fast bit in the motor select register to a zero state. When this takes place, the motor coast down circuit 362, in conjunction with the motor interrupt, provides a chopped signal to the motor drive selector 358. This chopped signal causes the motor to coast down to approximately one-sixth of its normal speed, which is held relatively constant under varying torque conditions. The motor coast down circuit 362 is implemented with a presettable counter such as a type 74LS161 chip. The motor interrupt signal is used to hold the counter reset which in turn disables the power to the motor. When a predetermined count is reached, the power will once again be applied. As the motor increases speed, the counter will be reset, turning the motor off, thus maintaining a relatively constant speed.

Once the microprocessor has determined that the motor has reached its full count, in other words the correct amount of liquor has been dispensed, the microprocessor will then output a control word to the station controller module to turn off the power to the motor. A bottle empty input port 364, implemented with two 74LS257 data selectors, receives commands from the microprocessor over the control, address and data buses. The port 364 provides the electrical interface between the microprocessor and the bottle empty sensors or float switches 58 (FIG. 1).

Figure 15:
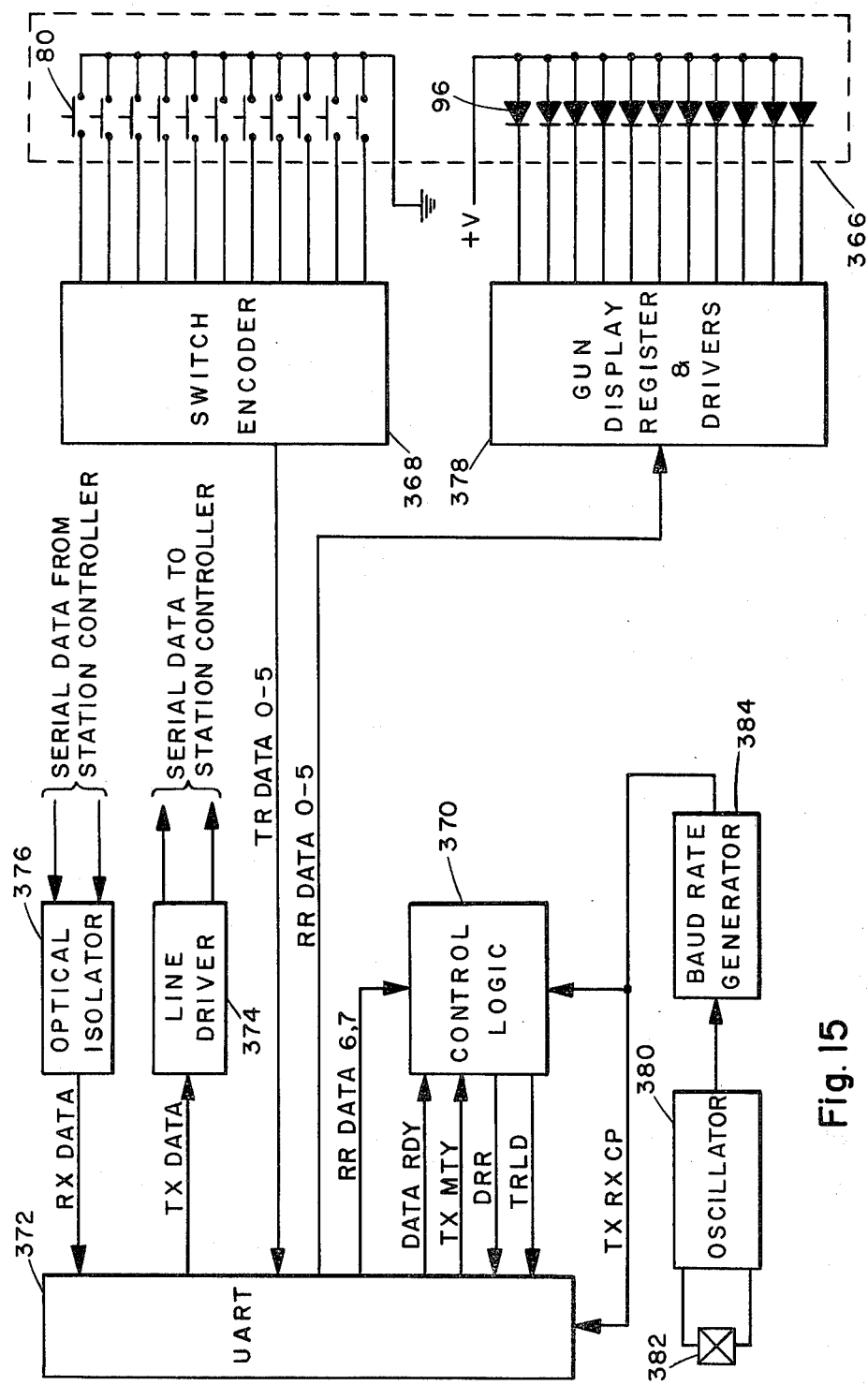

FIG. 15 illustrates a functional block diagram of the electronic circuitry which comprises each of the gun scanners 20 (FIGS. 1 and 12). The gun scanner provides a communication link between each dispensing gun and the central control circuit. In the illustrated embodiment, each dispensing gun contains eleven manually actuable switches representative of the liquor brands, pour size volumes, SHIFT button, COMP button and TTL button. Also contained in the dispensing gun are the eleven LEDs. These diodes represent the brands as well as the pour size volumes and the SHIFT button.

The electronic circuitry of the dispensing gun is surrounded by phantom lines 366 in FIG. 15. When one of the switches 80 is closed, the switch encoder 368 implemented with a pair of 74LS148 chips, converts the switch closure into a binary coded decimal value that is outputted on data lines TR DATA 0–5. The control logic 370 then generates a transmitter load signal TRLD to module 372 which is preferably a type 1863 UART chip. The UART 372 converts the parallel data on lines TR DATA 0–5 to serial data and then transmits the data serially over the TX DATA line to a line driver module 374 for transmission to the corresponding one of the station controller modules 306-309 (FIG. 12).

An input sequence for the gun scanner circuitry of FIG. 15 is very similar in that data from the station controller module is received by an optical isolator 376 which is then received by the UART 372 over the RX DATA line. The UART then assembles the serial data in its internal receiver holding register and outputs this data on the receiver register data lines RR DATA 0–7. The first five of these data lines contain the bit pattern for the gun display. The bit pattern for the gun display is loaded into a gun display register and driver chip 378 as a function of data bits 6 and 7. There are two types of data words which may be received by the scanner, namely the gun brand display data word, in which case bits 0–5 represent the brand display, and the other data word represents the portion type and control key display. Upon receipt of the data, the control logic 370 will then latch this data into the gun display register and driver 378. The gun display register and driver will then provide the necessary drive current to the LEDs 96 contained in the dispensing gun. The timing within the gun scanner is provided by an oscillator 380 connected to a 2.4576 megahertz crystal 382. This provides a 2.4576 megahertz clock signal to a baud rate generator 384. The baud rate generator is implemented with a binary counter type 74LS393 chip which provides the necessary clock to the UART 372 for 1200 baud serial communications.

Referring again to the overall functional block diagram of FIG. 12, each motor driver module 310 contains an optical isolator, a transistor Darlington driver circuit and an optical card reader. The optical isolator receives signals from the corresponding station controller module to turn on the transistor driver circuit, which in turn provides power to the pump motor 32. The pump motor shaft 244 (FIG. 7) is coupled to the pump drive shaft 30 by the chopper wheel 44. The chopper wheel is placed within the field of the beam emitter 46 and detector 48 which may comprise an optical infrared card reader. The turning motion of the chopper wheel breaks the beam of infrared energy and provides a signal back to the station controller module, depicting motion of the chopper wheel.

Each time a tooth in the chopper wheel breaks the infrared beam within the optical card reader, approximately 1/880 of an ounce of liquor is dispensed. Therefore, approximately 880 chops is equivalent to one ounce of liquor being dispensed. This method of positive feedback from the optical card reader to the microprocessor provides a 1/880 of an ounce granularity for controlling the amount of liquor being dispensed. The microprocessor has the ability to stop the motor within three teeth of the chopper wheel, thus providing the capability for a 3/881 of an ounce accuracy, not including any degradation in accuracy due to inaccuracies within the pump 24.

Referring to FIGS. 1, 7 and 12, the electronics for sensing the empty/full status of the individual liquor reservoirs includes the reed switch 204 which is reciprocated by the buoyant float 208 as the level of liquid within chamber 50 rises and falls. When the level of liquid in the chamber is sufficiently low, the reed switch is closed. This switch closure sends a signal to the station controller module 306, signalling that the liquor reservoir is empty.

Having described a preferred embodiment of our liquor metering and dispensing system and components thereof, it should be apparent to those skilled in the art that our invention may be modified in both arrangement and detail. The system could be utilized to meter and dispense liquids other than consummable liquids, for example liquid nutrients in a hydroponic garden. Also, the system could be programmed to simultaneously or sequentially dispense different liquids in the blending of liquid products, for example the pouring of mixed drinks. Therefore, the protection afforded our invention should be limited only in accordance with the scope of the following claims.

We claim:

1. A system for metering and dispensing liquid from a reservoir through a dispenser connected to the remote end of a flow line comprising:
    positive displacement pump means for receiving the liquid through a pump inlet and discharging a predetermined minute volume of the liquid through a pump outlet connected to the other end of the flow line for each predetermined amount of movement of a pump element;
    means for connecting the reservoir to the pump inlet;
    motor means for driving the pump means;
    input means for enabling an operator to select a desired pour size volume equal to or greater than the predetermined minute volume and for commanding the dispensing of the selected pour size volume;
    feedback control means for dispensing the selected pour size volume of the liquid through the dispenser in response to a command to the input means by energizing the motor means, counting the number of times that the pump element moves the predetermined amount, and de-energizing the motor means when the count indicates that the pump means has discharged the selected pour size volume of the liquid;
    means for monitoring the quantity of liquid in the reservoir;
    means for generating a restock signal to notify the operator when the reservoir is empty; and
    means for inhibiting energization of the pump means upon receiving the restock signal.

2. A liquid metering and dispensing system according to claim 1, wherein the pump element comprises a drive shaft of the pump means.

3. A liquid metering and dispensing system according to claim 1 wherein the feedback control means includes means for generating a pulse signal for each predetermined amount of movement of the pump element.

4. A liquid metering and dispensing system according to claim 1 wherein the feedback control means includes:
    means for tabulating accounting information representative of the total number of each selected pour size volume dispensed; and
    means for displaying the accounting information.

5. A liquid metering and dispensing system according to claim 1 and further comprising means for gradually de-energizing the motor means to prevent overshoot of the pump means that would cause a volume of the liquid greater than the selected pour size volume to be dispensed.

6. A liquid metering and dispensing system according to claim 4 and further comprising:
    means for displaying the accounting information; and
    printer means for selectively generating hard copy printouts of the accounting information.

7. A liquid metering and dispensing system according to claim 4 and further comprising:
    memory means for storing the accounting information.

8. Liquid metering and dispensing system according to claim 1 wherein the input means includes:
    a keyboard for selecting the desired pour size volume; and
    at least one switch mounted on the dispenser and adapted to be actuated by the operator for commanding the dispensing of the selected pour size volume of the liquid.

9. A liquid metering and dispensing system comprising:
    reservoir means for holding a quantity of at least one liquid to be dispensed;
    positive displacement pump means for receiving the liquid through a pump inlet and discharging a predetermined minute volume of the liquid through a pump outlet upon a predetermined amount of rotation of a pump shaft;
    means for connecting the reservoir means and the pump inlet;
    a liquid dispensing gun;
    at least one flow line connecting the pump outlet with the dispensing gun;
    motor means for driving the pump shaft;
    means for generating a pulse signal for each predetermined amount of rotation of the pump shaft;
    input means for enabling an operator to select a desired pour size volume of the liquid equal to or greater than the predetermined minute volume and to thereafter periodically command the selected pour size volume of the liquid to be dispensed through the gun;
    control means responsive to the input means for energizing the motor, counting the pulse signals, and thereafter de-energizing the motor when the total number of pulses indicates that the pump means has discharged the selected pour size volume;

means for monitoring the quantity of liquid in the reservoir means;

means for generating a restock signal to notify the operator when the reservoir means is empty; and means for inhibiting energization of the pump means upon receiving the restock signal.

10. A liquid metering and dispensing system comprising:

a plurality of reservoir means for holding separate quantities of different types of liquid;

a plurality of positive displacement pump means each corresponding to one of the reservoir means for receiving liquid therefrom through a pump inlet and discharging a predetermined minute volume of the liquid through a pump outlet for each predetermined amount of rotation of a pump shaft;

a plurality of motor means for each driving the pump shaft of a corresponding one of the pump means;

a plurality of means for each generating a pulse signal for each predetermined amount of rotation of a corresponding one of the pump shafts;

at least one dispensing gun;

a plurality of switches mounted on the gun and manually actuable by an operator to command the dispensing of a corresponding one of the types of liquid;

first means for providing separate liquid communication between each of the reservoir means and the pump inlet of the corresponding one of the pump means;

second means for providing separate liquid communication between each of the pump outlets and the dispensing gun;

keyboard means for enabling the operator to select a desired pour size volume of liquid equal to or greater than the predetermined minute volume;

control means coupled to the motor means, pulse generating means, plurality of switches and keyboard means for energizing a corresponding one of the motor means in response to the actuation of a selected one of the switches to cause the selected type of liquid corresponding to the one switch to be discharged from the dispensing gun, for counting the pulse signals generated during the energization of the corresponding one of the motor means, and for de-energizing the corresponding one of the motor means when the pulse signal count indicates that the selected pour size volume of the selected type of liquid has been dispensed; and gun scanner means coupled to the switches for sending coded signals to the control means representative of which of the switches is actuated.

11. A liquid metering and dispensing system according to claim 10 wherein the control means includes means for gradually de-energizing the corresponding one of the motor means to prevent overshoot of the corresponding one of the pump means that would cause a volume of the selected type of liquid greater than the selected pour size volume to be dispensed.

12. A liquid metering and dispensing system according to claim 10 wherein the control means further includes:

means for tabulating accounting information representative of the total number and type of liquid of each selected pour size volume dispensed.

13. A liquid metering and dispensing system according to claim 12 wherein the control means further comprises:

means for displaying the accounting information;

printer means for selectively generating hard copy printouts of the accounting information; and memory means for storing the accounting information.

14. A liquid metering and dispensing system according to claim 10 wherein each pump means further includes:

a housing defining a plurality of circumferentially spaced cylinders aligned with their axes generally parallel;

a plurality of pistons reciprocable in corresponding ones of the cylinders;

swash plate means mounted on the pump shaft for engaging and reciprocating the pistons as the pump shaft rotates;

a plurality of passages connecting the pump inlet, cylinders, and pump outlet; and check valve means for controlling the intake and exhaust of liquid from each of the cylinders.

15. A liquid metering and dispensing system according to claim 10 wherein each pulse signal generating means includes:

means adjacent the pump shaft of the corresponding pump means for emitting a beam of radiation in a generally axial direction with respect to the pump shaft;

means for detecting the beam of radiation and generating an output signal in response thereto; and chopper means mounted on the pump shaft for repeatedly intercepting the beam of radiation during rotation of the pump shaft.

16. A modularized liquid metering and dispensing system comprising:

an upright rack;

at least one liquor shelf adapted to be removably supported by the rack and including a plurality of chambers having inlets insertable into the spouts of a corresponding number of inverted bottles containing different types of liquor;

at least one pump shelf adapted to be removably supported by the rack and including a plurality of replaceable pump modules, each pump module having a pump with an inlet and an outlet and an electric motor for driving the pump;

at least one dispensing gun having a plurality of manually actuable switches corresponding to the different types of liquor;

first means for providing separate liquid communication between each of the chambers and the inlet of a corresponding one of the pumps;

second means for providing separate liquid communication between each of the pump outlets and the dispensing gun; and a central control terminal electrically connected to the dispensing gun switches and the pump motors for detecting the actuation of one of the switches and energizing one of the motors an amount sufficient to cause a predetermined pour size volume of the selected type of liquor to be dispensed through the gun.

17. A liquid dispensing gun comprising:

a case adapted to be grasped between the fingers and thumb of a user's hand and defining an interior sufficiently large to enclose a predetermined number of flow line segments; and a switch module mounted to the upper portion of the case including:

a PC board, a plurality of snap action switches mounted to the PC board, a plurality of LEDs mounted to the PC board adjacent corresponding ones of the switches, pliant means for encasing the PC board, switches and LEDs to prevent them from being exposed to corrosive agents, and a template overlying the pliant means and having a plurality of buttons therein in registration with corresponding ones of the snap action switches for closing the switches when depressed by a digit of the user's hand.

18. A reservoir assembly for receiving liquid from the spout of an inverted bottle comprising:

a chamber having a lower body portion with an outlet and a removable lid portion with an upwardly extending inlet;

corkmeans surrounding the inlet and manually expandable in the spout of the bottle for providing a liquid tight seal between the spout and the inlet;

a plunger valve normally sealing the inlet and actuable to open the inlet upon placing the lid portion of the chamber over the body portion; and a float switch mounted to the body portion of the chamber including a reed switch mounted inside an upwardly extending projection formed in a bottom wall of the body portion of the chamber, a magnet, and a float for buoyantly supporting the magnet inside the body portion of the chamber so that it can vertically reciprocate along the projection as the level of liquid in the body portion of the chamber varies to thereby close the reed switch when the body portion has been emptied of liquid.

* * * * *